United States Patent
Toko et al.

(10) Patent No.: US 10,054,674 B2
(45) Date of Patent: Aug. 21, 2018

(54) LIGHT EMITTING AND RECEIVING SYSTEM

(71) Applicant: STANLEY ELECTRIC CO., LTD., Meguro-ku, Tokyo (JP)

(72) Inventors: Yasuo Toko, Tokyo (JP); Yasuyuki Kawakami, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/785,704

(22) Filed: Oct. 17, 2017

(65) Prior Publication Data
US 2018/0113201 A1 Apr. 26, 2018

(30) Foreign Application Priority Data
Oct. 20, 2016 (JP) .................................. 2016-205885

(51) Int. Cl.
| | |
|---|---|
| *G01B 11/14* | (2006.01) |
| *G01S 7/481* | (2006.01) |
| *G02F 1/29* | (2006.01) |
| *G01S 17/06* | (2006.01) |
| *G02B 6/42* | (2006.01) |

(52) U.S. Cl.
CPC ............ *G01S 7/4816* (2013.01); *G01S 17/06* (2013.01); *G02F 1/29* (2013.01); *G02B 6/42* (2013.01); *G02F 2201/02* (2013.01); *G02F 2201/121* (2013.01); *G02F 2203/24* (2013.01)

(58) Field of Classification Search
CPC ............ G01N 2021/9513; G01S 17/89; G01S 7/4813
USPC .................. 356/614–623, 5.1, 5.15, 4.01
See application file for complete search history.

(56) References Cited

U.S. PATENT DOCUMENTS

| | | | |
|---|---|---|---|
| 7,586,624 B2 * | 9/2009 | Kim ..................... | B65G 49/064 356/614 |
| 2010/0157281 A1 * | 6/2010 | Luo ......................... | G01C 3/08 356/4.07 |
| 2013/0050068 A1 * | 2/2013 | Inoue .................... | G01J 1/4204 345/102 |
| 2015/0241564 A1 * | 8/2015 | Takano .................. | G01S 17/89 356/5.01 |

FOREIGN PATENT DOCUMENTS

DE  102011113147 B3  1/2013

* cited by examiner

*Primary Examiner* — Hoa Pham
(74) *Attorney, Agent, or Firm* — Holtz, Holtz & Volek PC

(57) ABSTRACT

To reduce the size, simplify the structure of a light emitting and receiving system. The system that detects a target object with the use of reflected lights gained from a light irradiated to the target object includes a flat-plate shaped light control apparatus having light control parts, a light-entry apparatus allowing light to enter into a light control part, a light-receiving apparatus that receives emitting lights from the remaining light control parts, a control apparatus that controls the light-entry apparatus and the light-receiving apparatus and detects the target object. The light control apparatus includes liquid crystal elements supporting light control parts between a pair of substrates and a drive unit to drive the liquid crystal elements. Each of the light control parts includes a pair of electrodes, a high-resistance film disposed between the electrodes, and a liquid crystal layer disposed at least to the region overlapping the high-resistance film.

17 Claims, 18 Drawing Sheets alignment direction

100

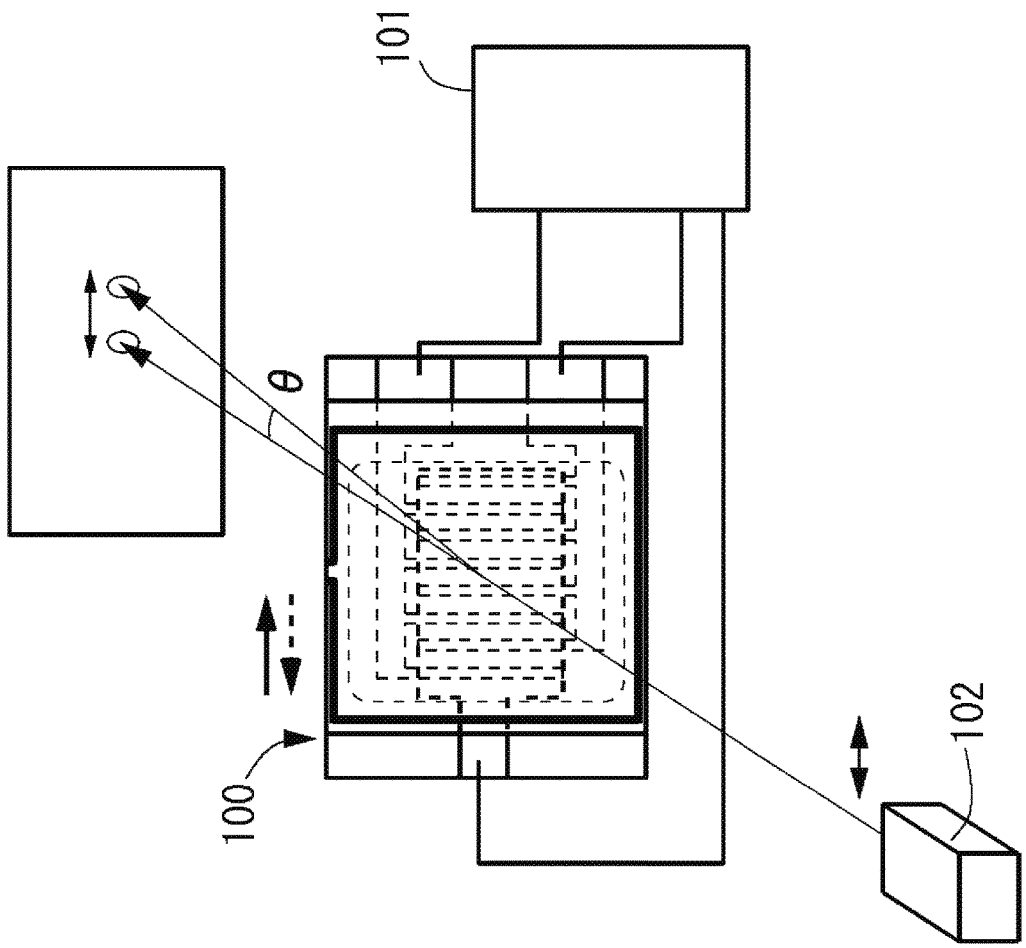

Fig.7

| cell thickness | alignment condition | alignment state | driving condition | result |
|---|---|---|---|---|
| 10 μm | anti-parallel | vertical alignment | 15V, 100Hz | light bending angle:10.8° response speed:300ms |
| 10 μm | anti-parallel | vertical alignment | 15V, 8kHz | light bending angle:14.4° response speed:300ms |
| 100 μm | anti-parallel | vertical alignment | 20V, 100Hz | light bending angle:19.4° response speed:5s |
| 100 μm | anti-parallel | vertical alignment | 20V, 8kHz | light bending angle:25.8° response speed:5s |

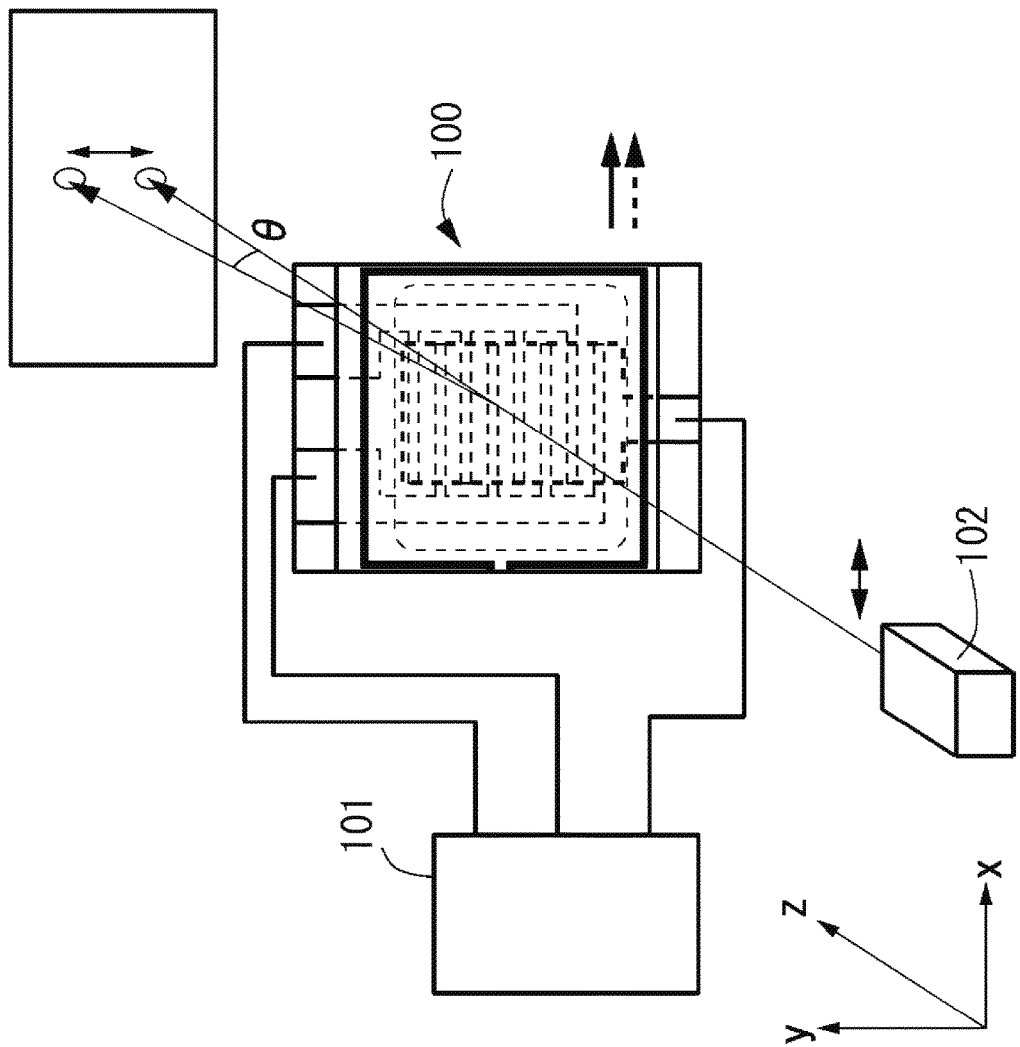

Fig.9

| cell thickness | alignment condition | alignment state | driving condition | result |
|---|---|---|---|---|
| 10μm | parallel | horizonal alignment | 30V, 100Hz | light bending angle:5.6° response speed:200ms |
| 100μm | parallel | horizonal alignment | 50V, 100Hz | light bending angle:10.0° response speed:3s |
| 100μm | anti-parallel | horizonal alignment | 50V, 100Hz | light bending angle:14.6° response speed:5s |

LIGHT EMITTING AND RECEIVING SYSTEM

BACKGROUND OF THE INVENTION

Field of the Invention

The present invention relates to a technique for detecting the distance and the location, etc. of a target object.

Description of the Background Art

German Patent DE102011113147B3 (Application number: DE201110113147) teaches a light emitting and receiving system capable of controlling the direction of the advancing light using multiple MEMS (Micro Electro Mechanical Systems) devices. In the light emitting and receiving system, measuring distance to a target object or detecting the position of the target object is achieved by irradiating light such as a laser beam or the like to the target object and receiving a reflected light beam therefrom. In recent years, with the development of autonomous driving technology in the automotive industry and various robotic technology, demands for such a light emitting and receiving system is growing.

In a light emitting and receiving system as described above, in many occasions, the reflected light beam from the target object is drastically attenuated.

Therefore, in order to ensure sufficient quantity of light from the reflected light beam, use of a large number of MEMS devices is required, thereby causing a cost increase due to an increase in the number of parts. Also, in many occasions, since there is dispersion in performance among the multiple MEMS devices, it is difficult to adjust the dispersion among the devices and receive light beams in a desired state. Further, the use of a reflective optical system causes the optical system to become complicated which also makes it difficult to miniaturize the system.

SUMMARY OF THE INVENTION

It is therefore an object of one aspect of the present invention to provide a technology which enables to reduce the size, simplify the structure, and reduce the cost of the light emitting and receiving system as well as to homogenize the receiving light beams.

[1] The light emitting and receiving system according to one aspect of the present invention is a light emitting and receiving system that detects a target object with the use of reflected lights gained from a light irradiated to the target object including (a) a flat-plate shaped light control apparatus having a plurality of light control parts capable of bending the direction of an incident light, (b) a light-entry apparatus that allows light to enter into one or more light control parts of the plurality of light control parts, (c) a light-receiving apparatus that receives emitting light from the remaining one or more light control parts of the plurality of light control parts, (d) a control apparatus that controls the operation of the light-entry apparatus and the light-receiving apparatus, and detects the target object using a signal according to the state of the emitting light emitted from the light-receiving apparatus, wherein (e) the light control apparatus includes (i) liquid crystal elements supporting the plurality of light control parts between a pair of substrates and (ii) a drive unit to drive the liquid crystal elements.

[2] The light emitting and receiving system according to another aspect of the present invention is a light emitting and receiving system that detects a target object with the use of reflected lights gained from a light irradiated to the target object including (a) a flat-plate shaped light control apparatus having a plurality of light control parts capable of bending the direction of an incident light, (b) a light-entry apparatus that allows light to enter into one or more light control parts of the plurality of light control parts, (c) a light-receiving apparatus that receives emitting light from the remaining one or more light control parts of the plurality of light control parts, (d) a control apparatus that controls the operation of the light-entry apparatus and the light-receiving apparatus, and detects the target object using a signal according to the state of the emitting light emitted from the light-receiving apparatus, wherein (e) the light control apparatus includes (i) a first liquid crystal element supporting a plurality of first light control parts capable of bending the incident light in a first direction between a pair of substrates, (ii) a second liquid crystal element disposed to overlap the first liquid crystal element supporting a plurality of second light control parts capable of bending the incident light in a second direction which crosses the first direction between a pair of substrates, (iii) a drive unit to drive the first liquid crystal element and the second liquid crystal element, and wherein (f) each of the plurality of light control parts is configured to overlap with one of the plurality of first light control parts and one of the plurality of second light control parts.

According to the foregoing configuration, it is possible to reduce the size, simplify the structure, and reduce the cost of the light emitting and receiving system as well as to homogenize the receiving light beams.

BRIEF DESCRIPTION OF THE DRAWINGS

FIG. 6 is a schematic diagram showing the configuration of a light control apparatus using the liquid crystal element.

FIG. 7 shows the measurement results of the light bending angle θ and the response speed, based on several conditions.

FIG. 8 is a schematic diagram showing another configuration of a light control apparatus using the liquid crystal element.

FIG. 9 shows the measurement results of the light bending angle θ and the response speed, based on several conditions.

DESCRIPTION OF THE PREFERRED EMBODIMENTS

Figure 1A:
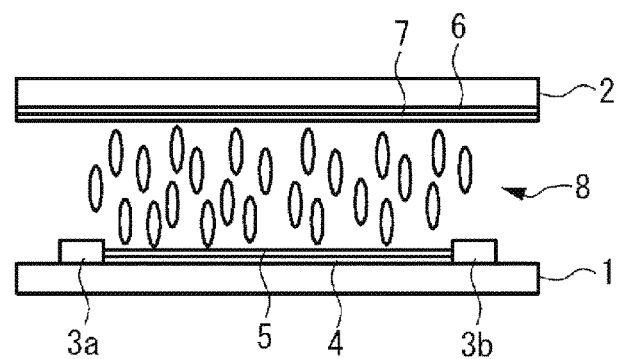
FIGS. 1A-1C are schematic cross sectional views to describe the basic structure and the operation principle of the liquid crystal element used in one embodiment of the light emitting and receiving system.
Figure 1B:
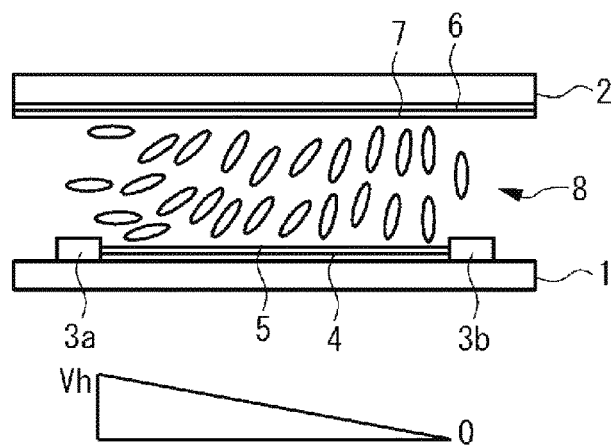
Figure 1C:
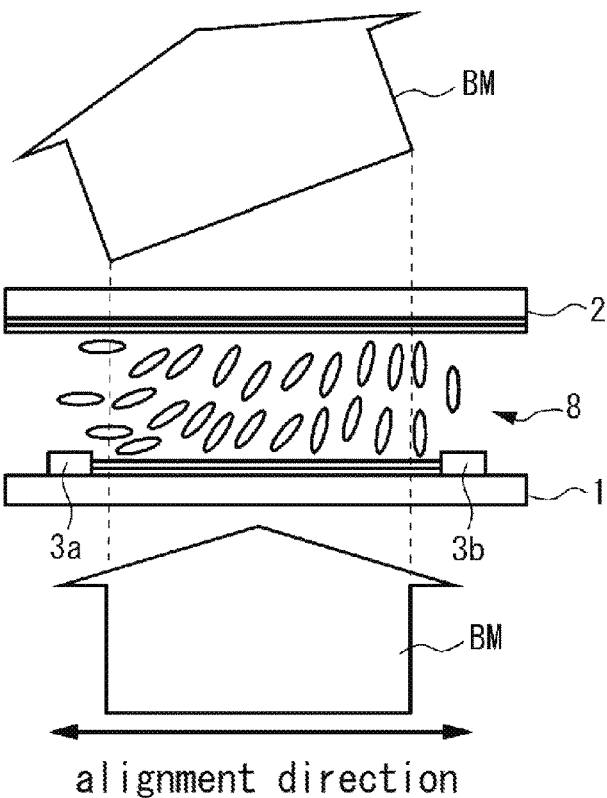

FIGS. 1A-1C are schematic cross sectional views to describe the basic structure and the operation principle of the liquid crystal element used in one embodiment of the light emitting and receiving system. In the liquid crystal element shown in FIG. 1A, a liquid crystal layer 8 is provided between a pair of substrates 1, 2 (transparent substrates) disposed opposite each other. And on one surface side of the substrate 1 is disposed a pair of electrodes 3a, 3b, a high-resistance film 4 provided between these electrodes 3a, 3b and connected thereto, and an alignment film 5 provided at least on the upper area of the high-resistance film 4. On one surface side of the substrate 2 is disposed a common electrode 6 provided to the area at least opposing each of the electrodes 3a, 3b and the high-resistance film 4, and an alignment film 7 provided at least on the upper area of the common electrode 6.

In the example shown in the figure, each of the alignment films 5, 7 is a vertical alignment film whose alignment regulation force extends in one direction and is performed an alignment process such as a rubbing treatment. Further, the liquid crystal layer 8 is formed by using liquid crystal material in which the dielectric anisotropy is negative. And the liquid crystal molecules in the liquid crystal layer 8 are affected by alignment regulation forces of the alignment films 5, 7 and are aligned in one direction (the horizontal direction in the figure for example). The liquid crystal molecules are substantially vertically aligned when voltage is not applied (initial alignment). The term "substantially vertically aligned" used here is defined as the pretilt angle to be close to yet smaller than 90°, for example, 88°-89.9°.

Note that, in principle, on each of the alignment films 5, 7, alignment process such as a rubbing treatment may be performed to achieve horizontal alignment films with alignment regulation force in one direction. In this case, the liquid crystal layer 8 is formed by using liquid crystal material in which the dielectric anisotropy is positive. And the liquid crystal molecules in the liquid crystal layer 8 are affected by alignment regulation force of the alignment films 5, 7 and are aligned in one direction (the horizontal direction in the figure for example). The liquid crystal molecules are substantially horizontally aligned when voltage is not applied (initial alignment). The term "substantially horizontally aligned" used here is defined as the pretilt angle to be close to yet greater than 0°, for example, 2°-5°.

As shown in FIG. 1B, for example, voltage is applied to generate a potential difference Vh between the electrode 3a and the electrode 3b. As an example, voltage of 15V is applied to the electrode 3a, and 0V is applied to the electrode 3b and the common electrode 6. An alternating voltage of 100 Hz frequency is applied, for example. This voltage application generates a continuous voltage gradient between the electrode 3a and the electrode 3b since the electrodes 3a, 3b are mutually conducted via the high-resistance film 4.

The alignment state of the liquid crystal molecules in the liquid crystal layer 8 changes according to this voltage gradient. Specifically, the closer the area is to the electrode 3a, the higher the voltage is in the area, and thus, the alignment state of the liquid crystal molecules changes greatly in this area according to this voltage. On the contrary, the closer the area is to the electrode 3b, the lower the voltage is in the area, and thus, the alignment state of the liquid crystal molecules changes slightly in this area according to this voltage. Further, in the area close to the electrode 3b, the alignment state of the liquid crystal molecules hardly changes. That is, between the electrode 3a and the electrode 3b where the high-resistance film 4 is present, the alignment state of the liquid crystal molecules in the liquid crystal layer 8 changes continuously according to the voltage gradient.

Polarized light such as a laser beam, etc. is made incident to the liquid crystal element in the state described above. For example, as shown in FIG. 1C, a beam BM whose polarization direction is parallel to the alignment processing direction of each of the alignment films 5, 7 (the alignment direction of the molecules in the liquid crystal layer 8) is made incident to the other surface side of the substrate 1. Then, as shown in the figure, since the alignment state of the molecules in the liquid crystal layer 8 is continuously changing and thus the state of retardation is different depending on the location inside the liquid crystal layer 8, the passing speed of the beam BM differs depending on the location it passes through. Therefore, by applying Huygens' principle, it is considered that the advancing direction of the beam BM which passes through the liquid crystal layer 8 changes. In the example shown in the figure, the beam BM changes its direction towards the electrode 3a side whose voltage is relatively high. Here, contrary to the above, if the voltage gradient is formed so that the voltage of the electrode 3b side becomes relatively high, the beam BM changes its direction towards the electrode 3b. Thus, at least a pair of electrodes 3a, 3b, a high-resistance film 4, and liquid crystal layer 8 are included to configure a region to control light (a light control part), and by controlling the state of voltage applied to each of the electrodes 3a, 3b, it is possible to freely bend the direction of the light entering and emitting from this region which controls light.

Figure 2:
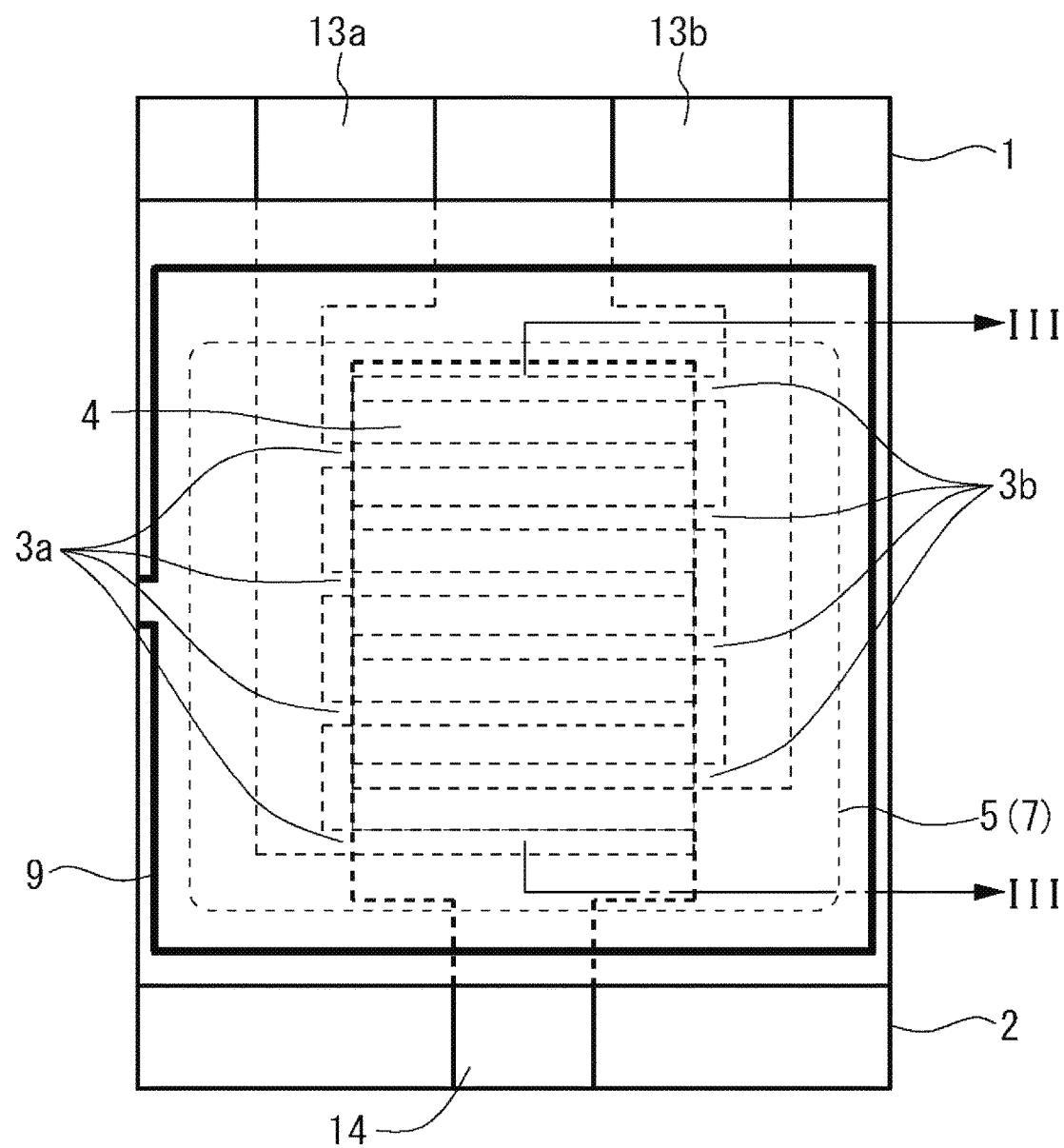
FIG. 2 is a schematic plan view showing the structure of a liquid crystal element in one embodiment.
Figure 3:
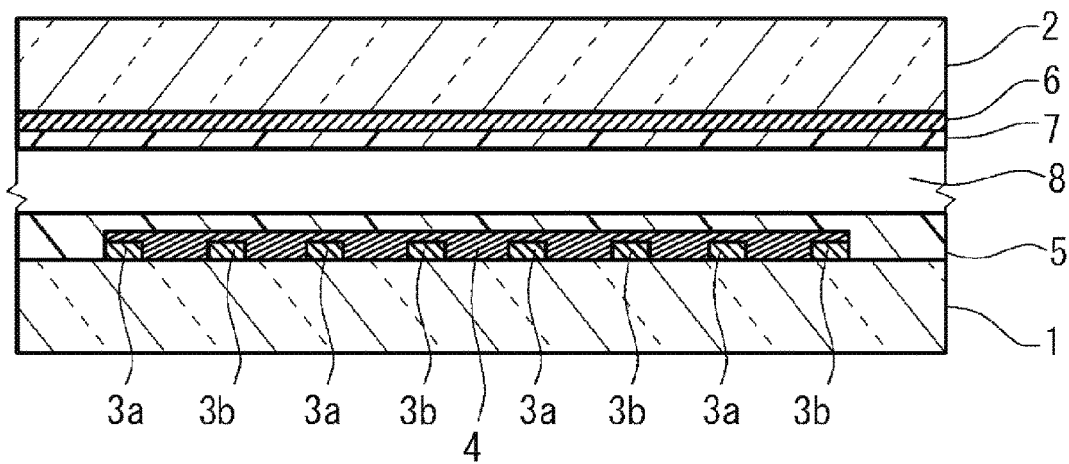
FIG. 3 is a schematic cross-sectional view showing the structure of the liquid crystal element in the embodiment.

FIG. 2 is a schematic plan view showing the structure of a liquid crystal element in one embodiment. And FIG. 3 is a schematic cross-sectional view showing the structure of the liquid crystal element in this embodiment. Note that the cross section view shown in FIG. 3 corresponds to the cross section in the direction shown in FIG. 2. In these figures, the same reference numerals are used for the components common to FIGS. 1A-1C. The liquid crystal element 100 of the present embodiment shown in each figure is configured to include a first substrate 1, a second substrate 2, a plurality of electrodes 3a, a plurality of electrodes 3b, a high-resistance film 4, a common electrode 6, alignment films 5, 7, a liquid crystal layer 8, and a seal member 9.

Both the first substrate 1 and the second substrate 2 are glass substrates, for example, having translucency. Here, the term "translucency" is defined as having transmittance high enough to allow transmission of the beam controlled by the liquid crystal element 100.

Each of the electrodes 3a, 3b is provided on one surface side of the first substrate 1. These electrodes 3a, 3b are formed by patterning a metal thin film with no translucency such as molybdenum, aluminum, copper, chromium or the like, for example. That is, each of the electrodes 3a, 3b has light-shielding property.

For example, in a planer view, each of the electrodes 3a is formed in a rectangular shape extending in one direction and is aligned at fixed intervals thereby arranged in a comb-teeth manner. Similarly, for example, in a planer view, each of the electrodes 3b is formed in a rectangular shape extending in one direction and is aligned at fixed intervals thereby arranged in a comb-teeth manner. Further, each of the electrodes 3a and each of the electrodes 3b are alternately arranged one by one, and are provided with a gap therebetween. (Refer to FIG. 4A which is to be described later.)

The electrode 3a is connected to an extraction electrode 13a via a wiring. The electrode 3b is connected to an extraction electrode 13b via a wiring. The extraction electrodes 13a, 13b are provided on one end side of the first substrate 1 (on the upper end side of the first substrate 1 in the example shown in the figure).

The high-resistance film 4 is disposed between each of the electrodes 3a, 3b. In the example shown in the figure, the high-resistance film 4 is disposed to cover between each of the electrodes 3a, 3b and further covers each of the electrodes 3a, 3b. The high-resistance film 4 is formed using a material whose sheet resistance is higher than that of the material used for each of the electrodes 3a, 3b. For instance, it is preferable for the high-resistance film 4 to have a sheet resistance value which is 10 times or more than that of the material used for each of the electrodes 3a, 3b, and more preferable to have a sheet resistance value which is approximately 10 to the second power times to 10 to the tenth power times.

The alignment film 5 is provided on one surface side of the first substrate 1 and covers each of the electrodes 3a, 3b and the high-resistance film 4. For this alignment film 5, either a vertical alignment film or a horizontal alignment film may be used selectively depending on how the initial alignment is determined on the liquid crystal layer 8.

The common electrode 6 is provided on one surface side of the second substrate 2. The common electrode 6 is formed, for example, by patterning a transparent conductive film made of ITO (indium tin oxide) or the like, for example. The common electrode 6 is provided to the area at least opposing each of the electrodes 3a, 3b. In the example shown in the figure, the common electrode 6 is formed rectangularly and is disposed extending in the vertical direction, partially opposing each of the electrodes 3a, 3b. The common electrode 6 is connected to an extraction electrode 14 via a wiring. The extraction electrode 14 is provided on one end side of the second substrate 2 (on the lower end side of the second substrate 2 in the example shown in the figure).

The alignment film 7 is provided on one surface side of the second substrate 2 and covers the common electrode 6. For this alignment film 7, either a vertical alignment film or a horizontal alignment film may be used selectively depending on how the initial alignment is determined on the liquid crystal layer 8.

The liquid crystal layer 8 is formed by using liquid crystal material in which the dielectric anisotropy is either negative or positive. And the initial alignment state (the alignment state when the voltage is not applied) of the liquid crystal layer 8 is determined by the alignment regulation forces from each of the alignment films 5, 7. For example, when vertical alignment films are used for each of the alignment films 5, 7, then the initial alignment state becomes a vertical one, and when horizontal alignment films are used for each of the alignment films 5, 7, then the initial alignment state becomes a horizontal one.

The seal member 9 used to seal the liquid crystal layer 8 is formed in a frame shape surrounding the liquid crystal layer 8 in a plane view, between the first substrate 1 and the second substrate 2. The seal member 9 has an opening in its portion, on its left side in the example shown in the figure, and this opening is used as an injection port and liquid crystal is injected therethrough.

FIGS. 4A-4F and FIGS. 5A-5B are schematic plan views describing the manufacturing process of a liquid crystal element in one embodiment.

Figure 4A:
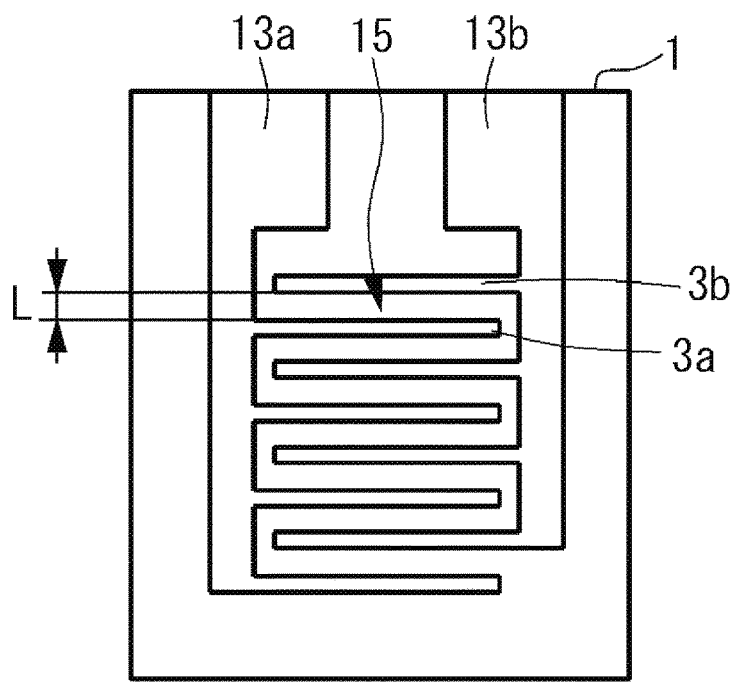
FIGS. 4A-4F are schematic plan views describing the manufacturing process of a liquid crystal element.

Referring to FIG. 4A, on one surface side of the first substrate 1 is formed each of the electrodes 3a, 3b, the wirings, and the extraction electrodes 13a, 13b. Each of the electrodes 3a, 3b, etc. are formed by preparing a glass substrate with a metal thin film formed on its entire one surface side and patterning the metal thin film. Each of the electrodes 3a, 3b, etc. are formed so that the width L of the slit portion 15 which is a gap formed between a pair of neighboring electrode 3a and 3b is approximately 500 μm, for example.

Figure 4B:
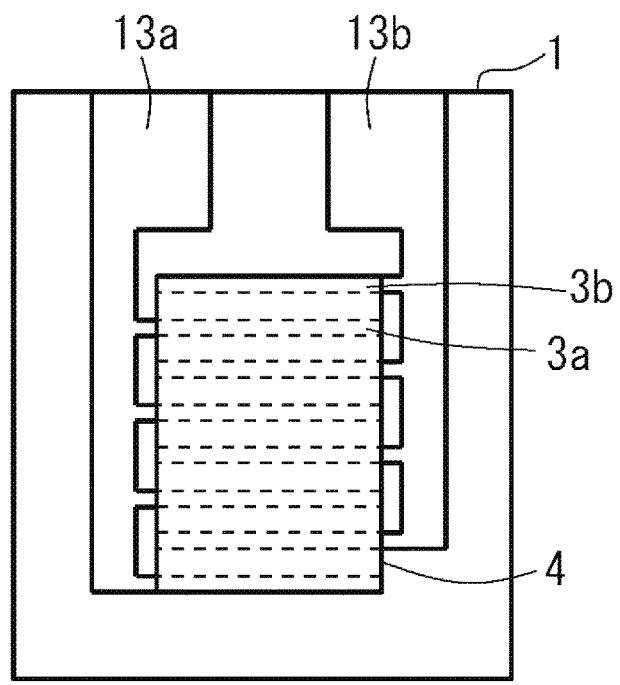

Next, referring to FIG. 4B, on one surface side of the first substrate 1 is formed the high-resistance film 4 between each of the electrodes 3a, 3b. In the example shown in the figure, the high-resistance film 4 is disposed to cover the area between each of the electrodes 3a, 3b and a portion of each of the electrodes 3a, 3b. At least, the high-resistance film 4 is required to cover the gap between each of the electrodes 3a, 3b. The high-resistance film 4 is formed using a material whose sheet resistance is higher than that of the material used for each of the electrodes 3a, 3b and a material being transparent in reference to the beam to be controlled.

As the high-resistance film 4 described above, for example, various metallic oxide films, a conductive polymer film (an organic conductive film), a thin film consisting of metal such as gold, a metal nanoparticle dispersed film or a metal oxide nanoparticle dispersed film, a nanoparticle dispersed film whose insulated nanoparticles are given electrical conductivity or the like may be cited. As the forming method of the high-resistance film 4, for example, vacuum film deposition methods such as sputtering or vacuum evaporation or the like, various printing methods such as flexographic printing, screen printing, inkjet printing, bar coating, slit coating, or the like, film forming method such as spin coating, dip-coating (including Langmuir-Blodgett method) or the like may be cited.

As described above, it is preferable for the high-resistance film 4 to have a sheet resistance value which is 10 times or more than that of the material used for each of the electrodes 3a, 3b, and more preferable to have a sheet resistance value which is approximately from 10 to the second power times to 10 to the tenth power times. As an example, if the sheet resistance of the ITO film used for each of the electrodes 3a, 3b is 0.5 Ω/sq, then the sheet resistance of the high-resistance film 4 may be about 1 kΩ/sq. It is preferable to set the sheet resistance higher in order to further reduce power consumption. Specifically, it is preferable to set the sheet resistance to approximately 50 Ω/sq-500 MΩ/sq, and for example, the resistance is to be set to about 5 MΩ/sq. As an example, a ZnO film formed by sputtering may be used as the high-resistance film 4.

Here, regarding the film forming region of the high-resistance film 4, it is acceptable that the region covers the area at least where the controlled beam passes through, but it is preferable that the region does not cover the upper area of each of the extraction electrodes 13a, 13b which is respectively connected to each of electrodes 3a, 3b. Also, when an organic conductive film whose adhesiveness to the substrate is not so high is used, it is preferable to avoid forming the high-resistance film 4 in the area where the seal member 9 is formed. Therefore, it is preferable to selectively form the high-resistance film 4 only to where it is required using mask sputtering or various printing methods, and if the film is formed onto the entire surface of the substrate using spin coating or the like, then it is preferable to perform patterning to remove the excessive portion by photolithography method or the like. Or it is acceptable to apply a resist film to each of the extraction electrodes 13a, 13b, form the high-resistance film 4 onto the films and then remove the resist films on the extraction electrodes 13a, 13b by lifting them off.

Further, an insulating film such as a passivation film or the like may be formed on the upper side of the high-resistance film 4. This is expected to prevent short circuit between the substrates and to improve optical function such as transmittance improvement, surface antireflection by matching the refractive index to the liquid crystal layer 8 or the like. When this insulating film is formed, also, it is preferable that it does not cover the upper side of each of the extraction electrodes 13a, 13b and the area where the seal member 9 is formed. Here, when silicon oxide film capable of flexographic printing is used for the insulating film, since adhesiveness to the substrate is very high, the insulating film may be formed on the area where the seal member 9 is formed.

Figure 4C:
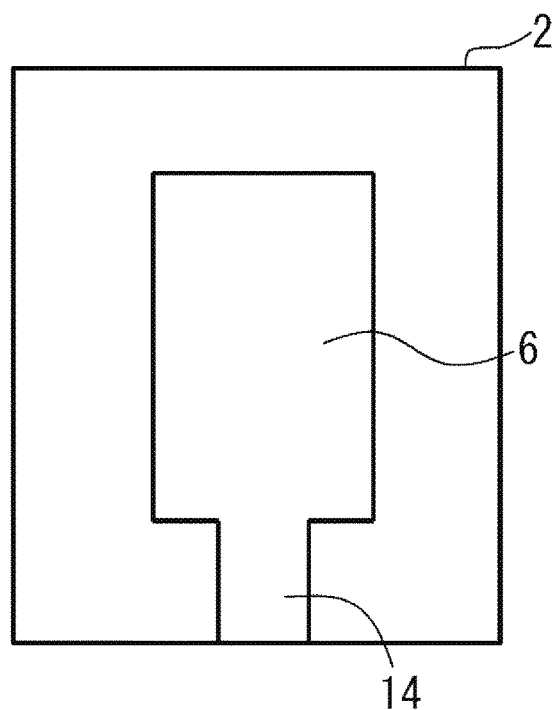

Next, referring to FIG. 4C, on one surface side of the second substrate 2 is formed the common electrode 6, the wiring and the extraction electrode 14. For example, the common electrode 6, etc. are formed by preparing a glass substrate with ITO film formed on its entire one surface side and patterning the ITO film.

Figure 4D:
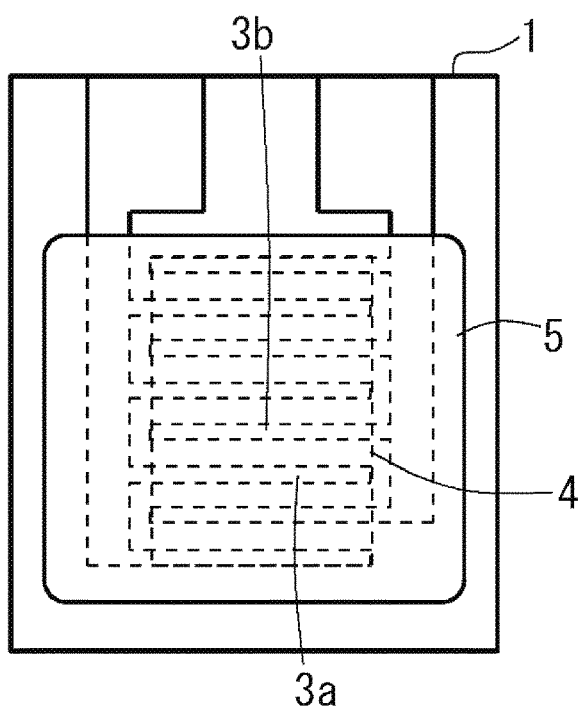
Figure 4E:
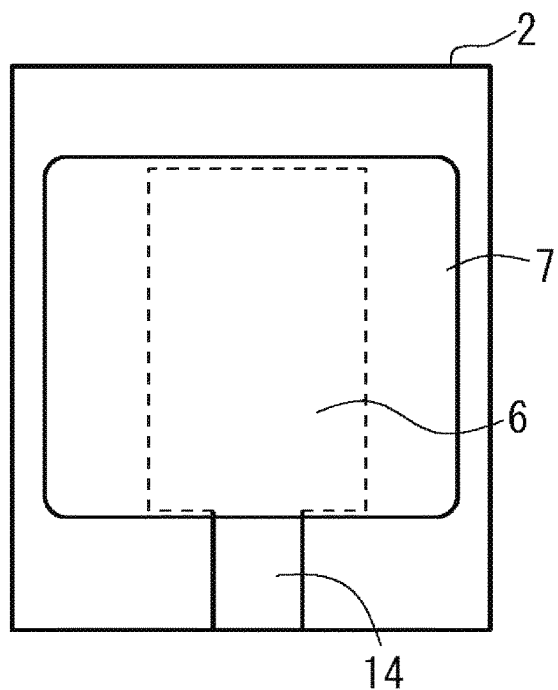

Next, referring to FIG. 4D, on one surface side of the first substrate 1 is formed the alignment film 5 to cover the region of at least where each of the electrodes 3a, 3b and the high-resistance film 4 are formed. Similarly, referring to FIG. 4E, on one surface side of the second substrate 2 is formed the alignment film 7 to the opposing region of at least where each of the electrodes 3a, 3b and the high-resistance film 4 are formed. Each of the alignment films 5,7 is formed by coating alignment film material by flexographic printing, inkjet printing or the like and then heat-treated.

When vertical alignment films are formed as the alignment films 5,7, for example, vertical alignment film material whose side chain has a rigid skeleton (liquid crystalline material or the like) and with superior printability and adhesiveness is formed to an appropriate film thickness (500-800 Å, for example) by flexographic printing and then heat-treated (at 160-250 C.° and 1-1.5 hour of baking, for example). Here, the organic alignment films are not limited to the above-described type. Further, inorganic alignment films whose main chain consists of siloxane bonds (Si—O—Si bonds) or the like may be used, for example.

When horizontal films are formed as the alignment films 5,7, for example, horizontal alignment film material for STN-LCD whose pretilt angle is relatively high and with side chains (alkyl chains) is formed to an appropriate film thickness (500-800 Å, for example) by flexographic printing and then heat-treated (at 160-250 C.° and 1-1.5 hour of baking, for example). Here, the organic alignment films are not limited to the above-described type. Further, inorganic alignment films (SiO obliquely vapor-deposited film, for example) may be used, for example.

Next, alignment process is performed to the alignment films 5,7. As the alignment process, rubbing process whose process is to rub the alignment film in one direction is performed, for example. As for the condition, the indentation amount may be set to 0.3-0.8 mm, for example.

When each of the alignment films 5,7 is a vertical alignment film, the direction of the rubbing process is preferably set to be substantially perpendicular (vertical direction in the figure) to the extending direction of each of the electrodes 3a, 3b (left-right direction in the figure). Here, it is not required to be precisely perpendicular and the direction of the rubbing process may be set to deviate by about 0.1-5° from the perpendicular direction, for example.

Also, when each of the alignment films 5,7 is a horizontal alignment film, the direction of the rubbing process is set to be substantially parallel to the extending direction of each of the electrodes 3a, 3b (left-right direction in the figure). Here, it is not required to be precisely parallel and the direction of the rubbing process may be set to deviate by about 0.1-5° from the parallel direction, for example.

Here, the direction of the rubbing process described above is merely an example and when each of the alignment films 5,7 is a vertical alignment film, the direction of the rubbing process may be set to be substantially parallel to the extending direction of each of the electrodes 3a, 3b (left-right direction in the figure). And when each of the alignment films 5,7 is a horizontal alignment film, the direction of the rubbing process may be set to be substantially perpendicular to the extending direction of each of the electrodes 3a, 3b (left-right direction in the figure).

Figure 4F:
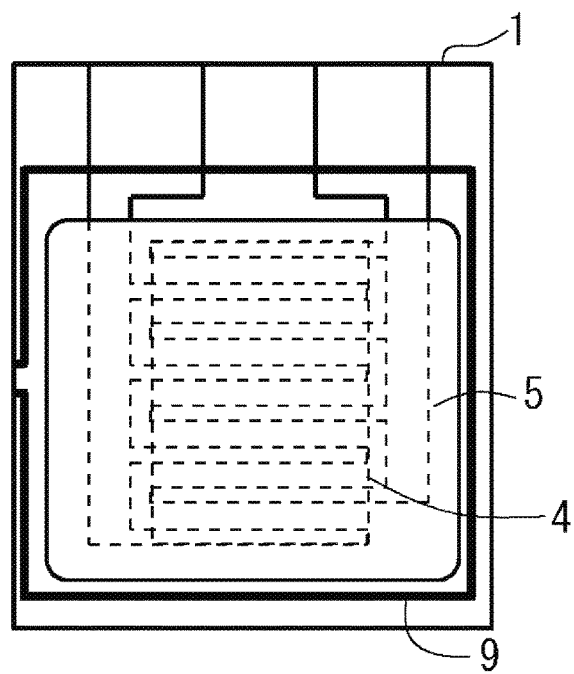

Next, referring to FIG. 4F, on one of the two substrates, on one surface side of the first substrate 1 for example, is formed a seal member 9 including appropriate amount (2-5 wt %, for example) of gap control material. The seal member 9 is formed by screen printing method or dispenser method, for example. Further, in this embodiment, the diameter of the gap control material is set so that the thickness of the liquid crystal layer 8 becomes approximately 10 μm.

The thickness of the liquid crystal layer 8 is not limited to the numerical value described above. When increasing the bending angle of light passing through (light bending angle) is desired, then the thickness of the liquid crystal layer 8 is to be increased. And when increasing the operating speed (response speed) of the liquid crystal layer 8 with respect to the electric field is desired, then the thickness of the liquid crystal layer 8 is to be decreased. Specifically, the thickness of the liquid crystal layer 8 may be set to 2 μm-500 μm, for example.

Further, on the other substrate, namely on one surface side of the second substrate 2, the gap control material is sprayed. For example, plastic balls whose grain diameters are 10 μm are sprayed using dry spreaders. Or rib forming material may be provided to control the gap. The height/thickness of the gap control material (or the rib forming material) in this case is set to be nearly equal to the diameter of the gap control material included in the seal member 9. Further, it is preferable that the gap control material (or the rib forming material) is not disposed to the gap between each of the electrodes 3a, 3b (the slit portion). Here, when the size of the liquid crystal element is larger than approximately 10 mm square, then it is preferable to apply this process, but when the size of the liquid crystal element is equal to or smaller than the said value, this process may be omitted.

Next, each of one surface side of the first substrate 1 and the second substrate 2 are overlapped so that they oppose each other, and then heat-treated while applying a constant pressure with a pressing machine or the like, thereby hardening the seal member 9. For example, heat treatment is performed at 150 C.° and 3 hours of baking. Consequently, the first substrate 1 and the second substrate 2 are bonded.

Figure 5A:
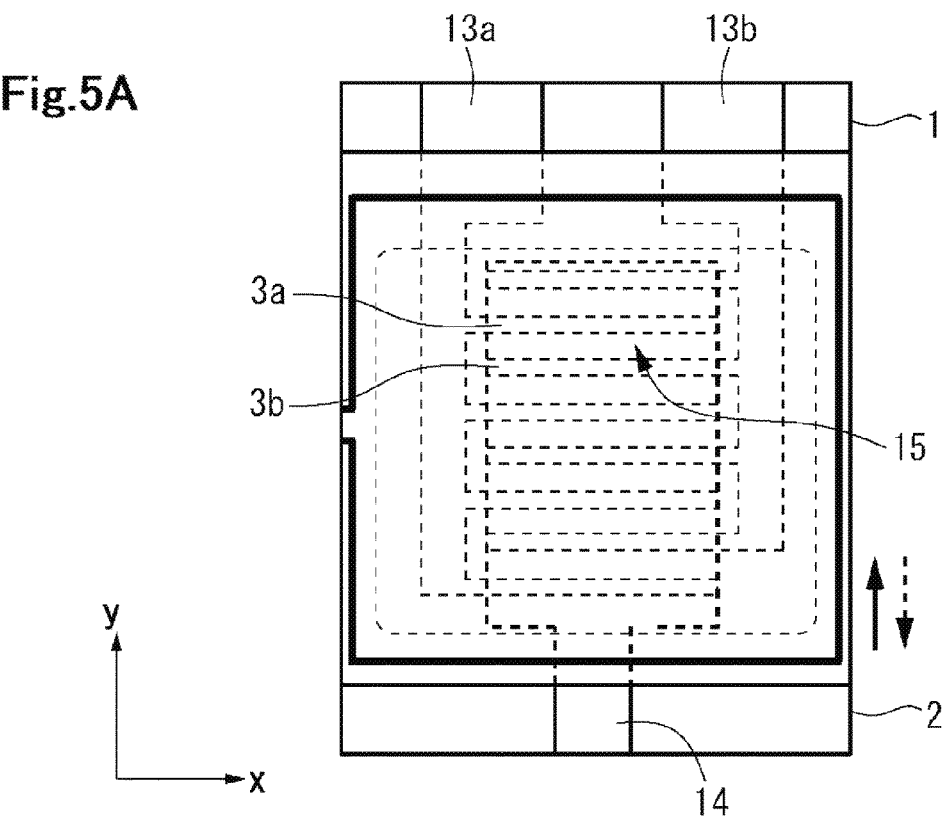
FIGS. 5A-5B are schematic plan views describing the manufacturing process of a liquid crystal element.

FIG. 5A is a schematic plan view of the cell (hereinafter referred to as cell 1) obtained by bonding the first substrate 1 and the second substrate 2 where each substrate forms a vertical alignment film as the alignment film 5,7, respectively. In this cell 1, as shown in the arrows in the lower right side of the figure, the alignment processing direction of the first substrate 1 (upward y-direction in the figure) and the alignment processing direction of the second substrate 2 (downward y-direction in the figure) becomes an antiparallel alignment. And further, each of the alignment processing directions is substantially perpendicular to the extending direction of a slit portion 15 between each of the electrodes 3a, 3b (x-direction in the figure). As described above, a slit portion 15 is a slit-shaped gap (groove) formed between a pair of the electrode 3a, 3b.

Figure 5B:
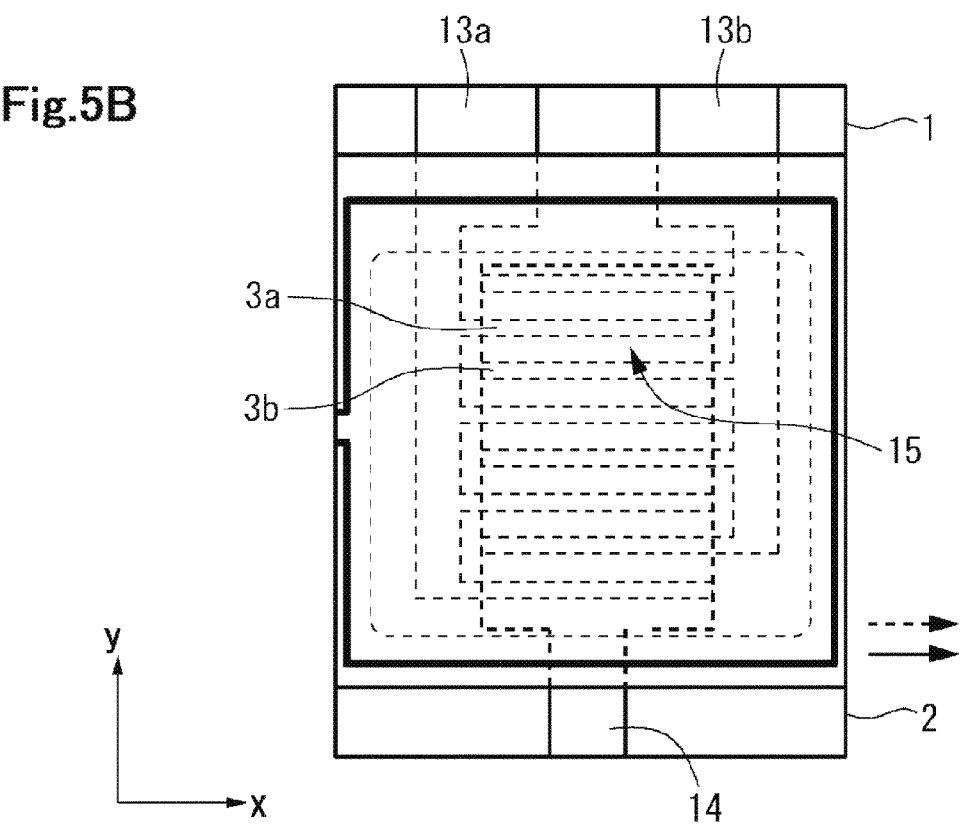

FIG. 5B is a schematic plan view of the cell (hereinafter referred to as cell 2) obtained by bonding the first substrate 1 and the second substrate 2 where each substrate forms a horizontal alignment film as the alignment film 5,7, respectively. In this cell 2, as shown in the arrows in the lower right side of the figure, the alignment processing direction of the first substrate 1 (toward the right along the x direction in the figure) and the alignment processing direction of the second substrate 2 (toward the right along the x direction in the figure) becomes a parallel alignment. And further, each of the alignment processing directions is substantially parallel to the extending direction of a slit portion 15 between each of the electrodes 3a, 3b (x-direction in the figure). Here, the alignment processing direction of the first substrate 1 and the alignment processing direction of the second substrate 2 may be an anti-parallel alignment. Either of the alignment processing directions may be selected in the above-described alignment processing step.

Next, to each of the cells 1, 2, a liquid crystal layer 8 is formed by filling liquid crystal material between the first substrate 1 and the second substrate 2. For example, through the injection port provided by the seal member 9, liquid crystal material is filled between the first substrate 1 and the second substrate 2 by vacuum injection method. Cell 1 is filled with liquid crystal material whose dielectric anisotropy $\Delta\varepsilon$ is negative (for example, the refractive index anisotropy $\Delta n$ being approximately 0.25). Cell 2 is filled with liquid crystal material whose dielectric anisotropy $\Delta\varepsilon$ is positive (for example, the refractive index anisotropy $\Delta n$ being approximately 0.2). Here, liquid crystal material with no chiral material included is used. In order to increase the light bending angle, it is preferable to use liquid crystal material whose refractive index anisotropy $\Delta n$ is greater.

After liquid crystal material is filled into each of the cells, the injection port is sealed with an end-seal. And by performing heat treatment above the phase transition temperature of the liquid crystal material (at 120 C.° and 1 hour of baking, for example), the alignment state of the liquid crystal elements of the liquid crystal layer 8 is stabilized. Liquid crystal element 100 is then completed.

FIG. 6 is a schematic diagram showing the configuration of a light control apparatus using the liquid crystal element. The light control apparatus comprises the liquid crystal element 100 corresponding to cell 1 as described above and a drive unit 101 to drive the liquid crystal element 100. The apparatus is capable of fully bending (changing) the direction of the advancing laser beam emitting from a light source 102, for example. In the example shown in the figure, the laser beam emitting from the light source 102 is a polarized light whose polarization direction is along the x-direction in the figure. The liquid crystal element 100 is arranged so that, in reference to the bending direction of the laser beam, the alignment processing direction of each of the alignment films 5,7 (the alignment direction of the liquid crystal layer 8) becomes substantially parallel and the extending direction of slit portion 15 (refer to FIGS. 5A, 5B) becomes substantially perpendicular. Further, the liquid crystal element 100 is arranged so that the laser beam enters substantially perpendicularly into the slit portion 15. The drive unit 101 is connected to each of the extraction electrodes 13a, 13b, 14 (refer to FIG. 2) and provides a driving voltage to the liquid crystal layer 8 via these electrodes.

For example, from the drive unit 101 to the liquid crystal element 100, alternating voltage is applied to each of the electrodes 3a and a reference potential is applied to each of the electrodes 3b and the common electrode 6 (for example, connecting to a grounding terminal) via each of the extraction electrodes 13a, etc. The voltage magnitude and frequency may be set as desired, and for example, is set to 15V and 100 Hz. Thus, the laser beam entering the slit portion 15 of the liquid crystal element 100 changes its advancing direction to one direction along the x-direction (for example, to the right) in the figure with reference to the advancing direction when voltage is not applied. Further, when alternating voltage is applied to each of the electrodes 3b and a reference potential is applied to each of the electrodes 3a and the common electrode 6 from the drive unit 101, the laser beam entering the liquid crystal element 100 changes its advancing direction to the opposite direction (for example, to the left).

Here, the voltage capable of changing the direction of the advancing laser beam to its maximum light bending angle $\theta$ depends on the distance between each of the electrodes 3a, 3b, the spot diameter of the laser beam, the liquid crystal layer thickness, and so on. Similarly, the frequency depends on the distance between each of the electrodes 3a, 3b, the spot diameter of the laser beam, the liquid crystal layer thickness, and so on, but there is a tendency for the maximum light bending angle $\theta$ to increase when the frequency is higher. FIG. 7 shows the measurement results of the light bending angle $\theta$ and the response speed, based on several conditions. In the figure, the measurement results of light bending angle $\theta$ and the response speed are shown when the driving condition and the liquid crystal layer thickness (cell thickness) were changed in the liquid crystal element 100 corresponding to cell 1. Now, the liquid crystal element 100 used for this measurement was manufactured by the process described above under the exemplified conditions.

FIG. 8 is a schematic diagram showing another configuration of a light control apparatus using the liquid crystal element. The light control apparatus comprises the liquid crystal element 100 corresponding to cell 2 as described above and a drive unit 101 to drive the liquid crystal element 100. The apparatus is capable of fully bending (changing) the direction of the advancing laser beam emitting from a light source 102, for example. In the example shown in the figure, the laser beam emitting from the light source 102 is a polarized light whose polarization direction is along the x-direction in the figure. The liquid crystal element 100 is arranged so that, in reference to the bending direction of the laser beam, the alignment processing direction of each of the alignment films 5,7 (the alignment direction of the liquid crystal layer 8) becomes substantially parallel and the extending direction of slit portion 15 (refer to FIGS. 5A, 5B) also becomes substantially parallel. Further, the liquid crystal element 100 is arranged so that the laser beam enters substantially perpendicularly into the slit portion 15. The drive unit 101 is connected to each of the extraction electrodes 13a, 13b, 14 (refer to FIG. 2) and provides a driving voltage to the liquid crystal layer 8 via these electrodes.

For example, from the drive unit 101 to the liquid crystal element 100, alternating voltage is applied to each of the electrodes 3a and a reference potential is applied to each of the electrodes 3b and the common electrode 6 (for example, connecting to a grounding terminal) via each of the extraction electrodes 13a, etc. The voltage magnitude and frequency may be set as desired, and for example, is set to 30V and 100 Hz. Thus, the laser beam entering the liquid crystal element 100 changes its advancing direction to one direction along the y-direction (for example, to the upward direction) in the figure with reference to the advancing direction when voltage is not applied. Further, when alternating voltage is applied to each of the electrodes 3b and a reference potential is applied to each of the electrodes 3a and the common electrode 6 from the drive unit 101, the laser beam entering the liquid crystal element 100 changes its advancing direction to the opposite direction (for example, to the downward direction).

Here, the voltage capable of changing the direction of the advancing laser beam to its maximum light bending angle $\theta$ depends on the distance between each of the electrodes 3a and 3b, the spot diameter of the laser beam, the liquid crystal layer thickness, and so on. Similarly, the frequency depends on the distance between each of the electrodes 3a and 3b, the spot diameter of the laser beam, the liquid crystal layer thickness, and so on, but there is a tendency for the maximum light bending angle $\theta$ to increase when the frequency is higher. FIG. 9 shows the measurement results of the light bending angle $\theta$ and the response speed, based on several conditions. In the figure, the measurement results of light bending angle $\theta$ and the response speed are shown when the driving condition and the liquid crystal layer thickness (cell thickness) were changed in the liquid crystal element 100 corresponding to cell 2. Now, the liquid crystal element 100 used for this measurement was manufactured by the process described above under the exemplified conditions. The above description explains the parallel alignment as the alignment state. Further, an antiparallel-aligned liquid crystal element 100 was manufactured and then compared to the parallel-aligned liquid crystal element 100. As a result, there was a tendency for the parallel-aligned liquid crystal element to increase its response speed, yet reduce its light bending angle. The cause for the increase in response speed of the parallel-aligned element is considered that when voltage is applied to the liquid crystal layer, alignment mode transitions from splay-alignment to bend-alignment and the element operates in the bend-alignment mode.

To summarize the driving method of the liquid crystal element, since the liquid crystal element of the embodiment is provided a first substrate 1 with a plurality of electrodes 3a, 3b and a second substrate 2 with a common electrode 6, the liquid crystal layer 8 can be AC driven by these electrodes. While AC driven, when light bending angle is not to be changed ($\theta=0$), then each of the electrodes 3a, 3b are set to the same potential and the potential of the common electrode 6 may be same as that of each of the electrodes 3a, 3b or may be different. When the direction of the light is to be changed, then the plurality of electrodes 3a and the common electrode 6 are provided the same potential and the plurality of electrodes 3b is provided a different potential. Further, when the direction of the light is to be reversed, then the plurality of electrodes 3b and the common electrode 6 are provided the same potential and the plurality of electrodes 3a is provided a different potential. By the use of this driving method, the direction of the advancing light can be controlled symmetrically along a predetermined direction (for example, the vertical direction or the horizontal direction).

As described above, by using one liquid crystal element, it is possible to bend the advancing light along a one-dimensional direction. Further, by combining two such liquid crystal elements, the advancing light can be bent in a two-dimensional direction. The following describes the configuration to realize the two-dimensional bending of the advancing light.

Figure 10A:
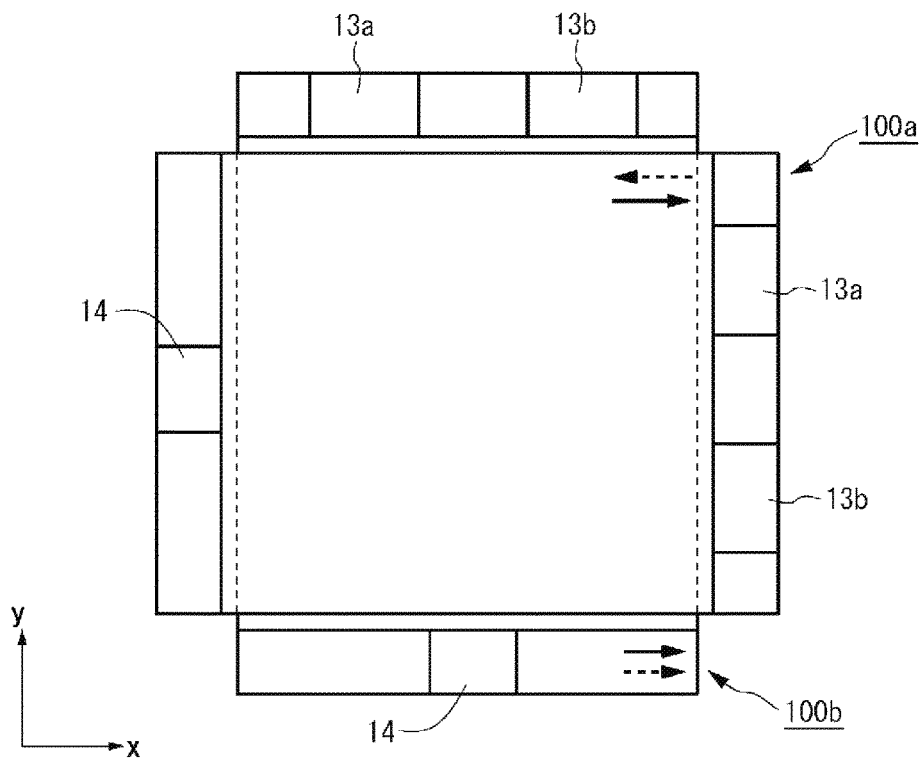
FIG. 10A is a schematic plan view showing the configuration of a light control apparatus combining two liquid crystal elements.

FIG. 10A is a schematic plan view showing the configuration of a light control apparatus combining two liquid crystal elements. Here, in this figure, the drive units to drive each of the liquid crystal elements are omitted. The light control apparatus shown in FIG. 10A includes a liquid crystal element 100a corresponding to cell 1 and a liquid crystal element 100b corresponding to cell 2 as described above disposed to overlap each other.

In detail, the liquid crystal element 100a is disposed on the front side of the figure and a slit portion 15 extending in one direction is disposed so that its extending direction is parallel to the y-direction. Here, the alignment direction of the molecules in the liquid crystal layer 8 is parallel to the y-direction and is an anti-parallel alignment. Further, the liquid crystal element 100b is disposed on the back side of the figure and a slit portion 15 extending in one direction (refer to FIG. 5B) is disposed so that its extending direction is parallel to the x-direction. Here, the alignment direction of the molecules in the liquid crystal layer 8 is parallel to the x-direction and is a parallel alignment.

Figure 10B:
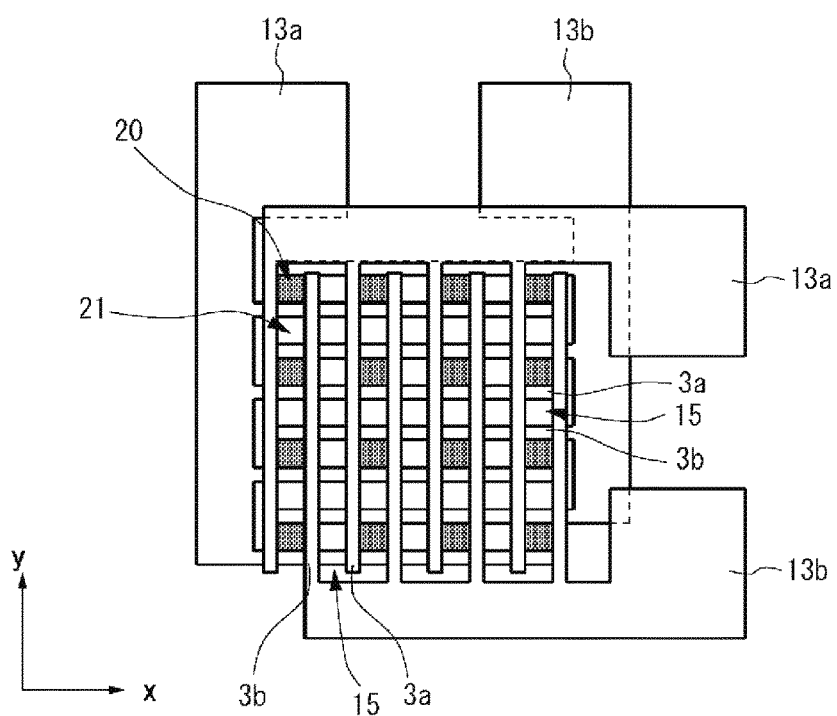
FIG. 10B is a figure describing the electrode arrangement of each of the liquid crystal elements.

FIG. 10B is a figure describing the electrode arrangements of each of the liquid crystal elements. As shown in the figure, the liquid crystal element 100a on the front side is disposed so that the slit portion 15 which is a groove (gap) between each of the electrodes 3a, 3b extends in the direction substantially parallel to the y-direction (the vertical direction). And the liquid crystal element 100b on the back side is disposed so that the slit portion 15 which is a groove (gap) between each of the electrodes 3a, 3b extends in the direction substantially parallel to the x-direction (the horizontal direction). Further, the two elements are disposed so that the slit portion 15 of the liquid crystal element 100a and the slit portion 15 of the liquid crystal element 100b cross each other (in this example, cross perpendicularly to each other). Among a plurality of the rectangular areas where each of the vertical and horizontal slit portions 15, 15 overlap, each of the rectangular areas 20 alternately arranged in horizontal and vertical direction as well as oblique direction is used as a region where the controlled light enters. In the following, each of these rectangular areas 20 is defined as "a light control region (a light control part) 20". In the figure, each of the light control regions 20 is shown with a pattern. Further, each of the rectangular areas 21 other than the light control regions 20 is not used as a light control region in this embodiment since the light is bent to a direction different from that of the light control region 20 when the controlled light enters. This is because each of the electrodes 3a, 3b is alternately arranged in x-direction (the horizontal direction) or y-direction (the vertical direction) and thus the voltage gradient direction of the electrode 3a and that of the electrode 3b are opposite each other at the slit portion 15. Therefore, as shown in the figure, each of the multiple light control regions 20 is arranged alternately in x-direction and y-direction. In the example shown in the figure, each of the light control regions 20 is arranged to form a 4 by 4 matrix. Each of the light control region 20 is configured so that a light control region (first light control region) provided at the slit portion 15 of the liquid crystal element 100a and another light control region (second light control region) provided at the slit portion 15 of the liquid crystal element 100b overlap each other.

The liquid crystal element 100a disposed on the front side is capable of changing the advancing direction of the laser beam emitting from the light source 102 along the x-direction in the figure by applying a driving voltage from the drive unit 101 thereto via each of the electrodes 3a, 3b and the common electrode 6 (refer to FIG. 6). Further, the liquid crystal element 100b disposed on the back side is capable of changing the direction of the advancing laser beam emitting from the light source 102 along the y-direction in the figure by applying a driving voltage from the drive unit 101 thereto via each of the electrodes 3a, 3b and the common electrode 6 (refer to FIG. 8). Thus, by disposing the two liquid crystal elements 100a, 100b to overlap each other as shown in FIG. 10A, it is possible to change the direction of the advancing light to the x-direction and the y-direction, or the vertical direction and the horizontal direction.

In this embodiment, the bending direction of the advancing light by the liquid crystal element 100a on the front side is parallel to the x-direction. Since the slit portion of the liquid crystal element 100b on the back side is disposed at where the light is advancing and extended parallel to the x-direction, it is possible to easily guide the light into the slit portion 15 of the liquid crystal element 100b disposed on the back side even when the emitting light sways in the x-direction. Thus, since the liquid crystal element 100a disposed on the front side controls the direction of light along the x-direction and the liquid crystal element 100b disposed on the back side controls the direction of light along the y-direction, consequently it is possible to control the direction of the light emitting from the liquid crystal element 100b two-dimensionally.

Figure 11:
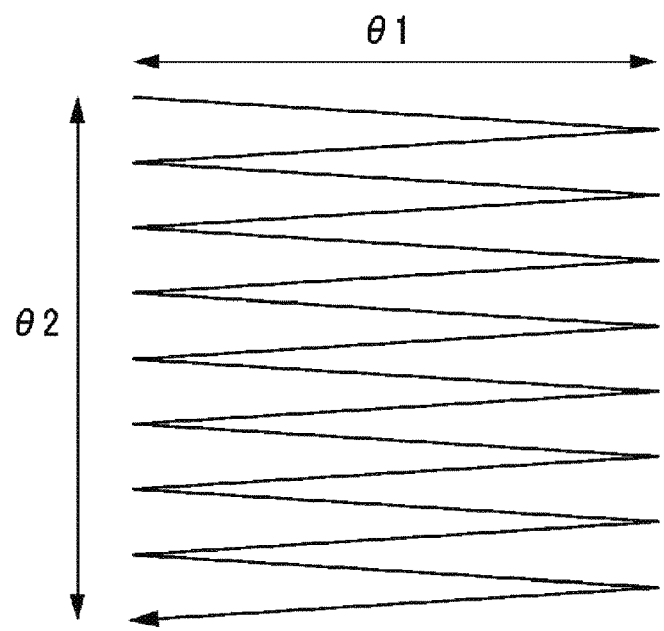
FIG. 11 shows how the incident light is scanned two-dimensionally.

Further, by creating a difference between the response speed of the liquid crystal element 100a on the front side and the liquid crystal element 100b on the back side, as shown in FIG. 11, it is possible to scan the incident light two-dimensionally. In this case, the incident light is scanned within the range defined by the light bending angle θ1 from the liquid crystal element 100a and the light bending angle θ2 from the liquid crystal element 100b. For example, by using the liquid crystal element 100a on the front side whose cell thickness is 10 μm (refer to FIG. 7, second row) and the liquid crystal element 100b on the back side whose cell thickness is 100 μm (refer to FIG. 9, third row) and by applying voltage alternately and repeatedly to the liquid crystal element 100a as 15V, 0V, 15V, ... at 300 ms cycle, and further applying voltage alternately and repeatedly to the liquid crystal element 100b as 50V, 0V, 50V, ... at 5 s cycle, it is possible to scan the light within the range defined by the light bending angle θ1=14.4° and the light bending angle θ2=14.6°.

Also, when laser beam is not applied continuously but intermittently, it is possible to scan the light only in an arbitrary area within the range defined by each of the light bending angles θ1, θ2. Further, it is possible to apply a reverse bias by alternately switching/selecting the electrode to be the high potential side, between each of the electrodes 3a, 3b, thereby increasing the response speed.

Figure 12:
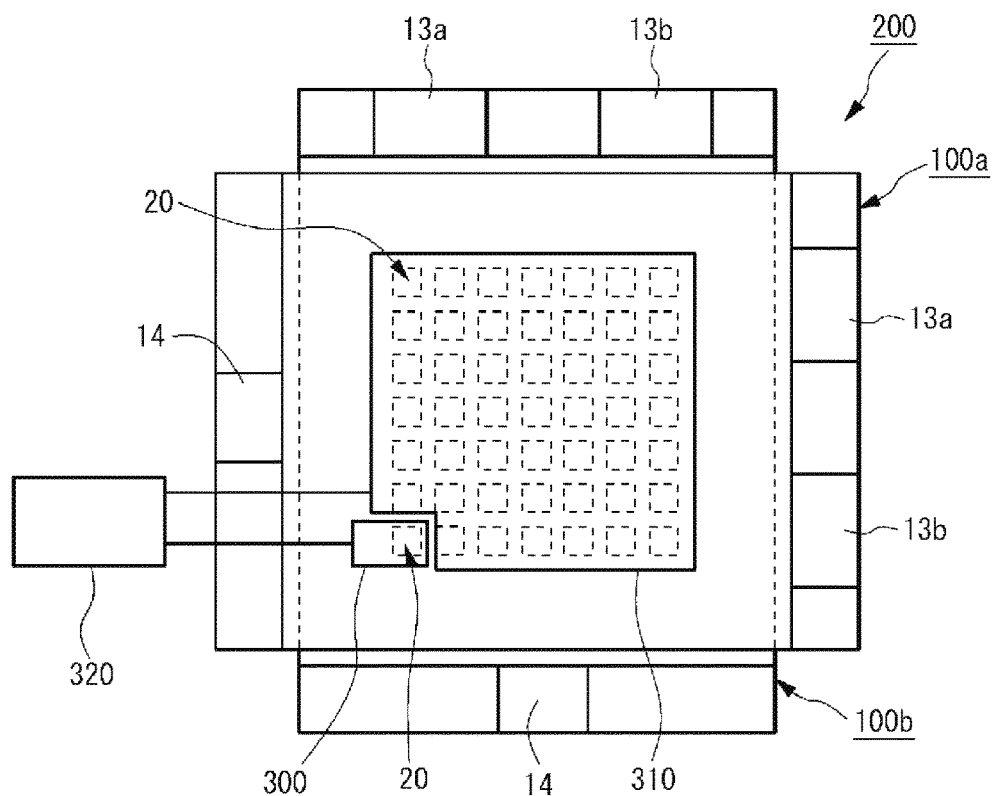
FIG. 12 is a schematic plan view to describe the configuration of a light emitting and receiving system using a light control apparatus combining two liquid crystal elements.

FIG. 12 is a schematic plan view to describe the configuration of a light emitting and receiving system using a light control apparatus combining two liquid crystal elements. The light emitting and receiving system is used to measure distance to a target object or detecting the position of the target object, etc. by irradiating a laser beam to the target object and receiving a reflected light therefrom. As a method for measuring the distance, a well-known time of flight (TOF) principle is used. TOF principle, roughly stating, is a method to measure the distance between a sensor and an object by irradiating a laser beam to the target object and measure time required for the reflected light bouncing off the object to return. As for the laser beam, a beam having the pulse width of femto second order is used, for example. As for the wavelength of the laser beam, in accordance with the optical properties (absorption coefficient) of the liquid crystal material used in the liquid crystal element, it is preferable to select a wavelength with less light absorption. Stated differently, when the wavelength of the laser beam to be used is prearranged, it is preferable to select a liquid crystal material whose light absorption is low at the corresponding wavelength. For example, it is preferable to select a laser beam whose wavelength is within the infrared ray wavelength region, and wavelengths such as 905 nm, 970 nm, 1050 nm or the like whose transmittance is high in reference to the liquid crystal material may be selected.

In the light emitting and receiving system of this embodiment, the light control apparatus 200 is configured by combining the liquid crystal element 100a disposed on the front side and the liquid crystal element 100b disposed on the back side, and the apparatus is provided with a plurality of light control regions 20 arranged in a matrix (in the example shown in the figure, a number of 4×4=16). Among these light control regions 20, for example, one of the light control region 20 (in the example shown in the figure, the one in the lower left of the matrix) is used as a light-entry region while each of the other light control regions 20 is used as a light-receiving region. The size of each of the light control regions 20 is preferably set within the range of 50 μm square and 2000 μm square, for example.

A light-entry apparatus 300 emits a laser beam to the light control region 20 (the light-entry region) located in the lower left. And through this light control region 20, the laser beam is emitted to the target object and a plurality of reflected light beams bounces off from the target object caused by the emitted laser beam. Then, the plurality of reflected light beams is detected by a light-receiving apparatus 310 through each of the light control regions 20 (light-receiving regions). A control apparatus 320 controls the operation of the light-entry apparatus 300 and the light-receiving apparatus 310, and derives the distance from the target object to the apparatus.

Figure 13A:
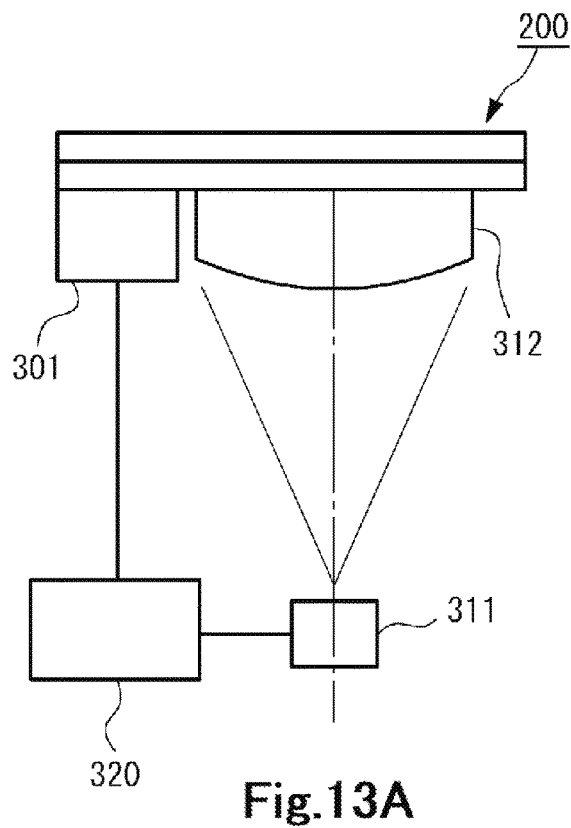
FIG. 13A is a diagram showing a configuration example of the light-entry apparatus and the light-receiving apparatus.

FIG. 13A is a diagram showing a configuration example of the light-entry apparatus and the light-receiving apparatus. In the configuration example shown in FIG. 13A, the light-entry apparatus 300 is configured to include a light source 301 which emits a laser beam. The light source 301 is disposed so as to emit a laser beam in the direction normal to one of the light control regions 20 of the liquid crystal element 100a on the front side of the light control apparatus 200. Further, the light-receiving apparatus 310 is configured to include a light-receiving element 311 and a lens optical system 312.

The lens optical system 312 is configured to include a convex lens such as a Fresnel lens, micro convex lens or the like, and collects lights emitting in the direction normal to each of the multiple light control regions 20 of the liquid crystal element 100a on the front side of the light control apparatus 200 to the light-receiving element 311. The lens optical system 312 does not collect lights emitting in the direction non-normal to each of the multiple light control regions 20 to the light-receiving element 311. The light-receiving element 311 outputs an electric signal according to the intensity of the light entering the light-receiving surface. The distance between the light-receiving element 311 and the light control apparatus 200 is determined in accordance with the focal distance of the lens optical system 312. The lens of the lens optical system 312 and the light control apparatus 200 may be adhered closely, but it is also preferable to provide a gap of 0.7 mm or more therebetween. Here, when using a light-receiving element 311 whose light-receiving surface area is large enough to receive all the lights emitting from the multiple light control regions 20, the lens optical system 312 may be omitted. (Hereinafter the same.)

Figure 14:
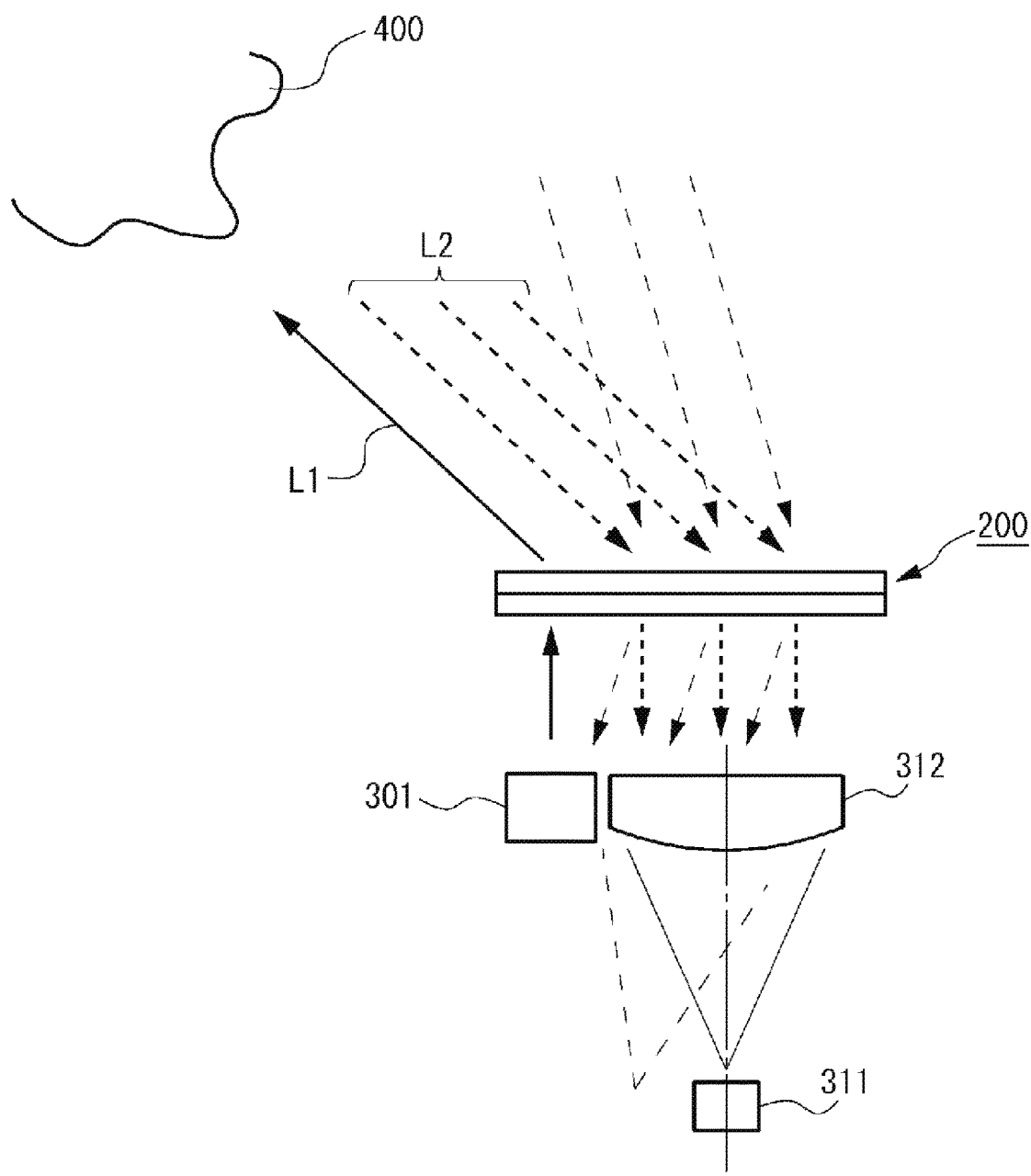
FIG. 14 is a diagram to illustrate the principle for determining the distance between the target object and the apparatus.

FIG. 14 is a diagram to illustrate the principle for determining the distance, etc. between the target object and the apparatus. Here, for ease of understanding the path of the laser beam, the light source 301 and the lens optical system 312 are disposed apart from the light control apparatus 200. However, in reality, it is preferable that both are adhered closely to the light control apparatus 200. The light source 301 shown in the figure is controlled by the control apparatus 320 and emits a laser beam. Since the direction of the laser beam L1 can be freely changed by the light control apparatus 200 (refer to FIG. 11), by changing the direction of the laser beam L1 per unit time, it is possible to scan in the direction where the target object 400 exists with the laser beam L1.

By applying the laser beam L1 to the target object 400, a portion of the laser beam returns as a plurality of reflected lights L2 and enters the light control apparatus 200. Each of these reflected lights L2 entering the apparatus then enters the plurality of light control regions 20 and the direction of each light is changed to the direction normal to the surface of the light control regions 20, for example. The reflected lights L2 emitted from the light control apparatus 200 are collected by the lens optical system 312 and then enter the light-receiving element 311. The light-receiving element 311 outputs an electric signal to the control apparatus 320 according to the intensity of the reflected lights L2 entering the element.

The control apparatus 320 derives the distance from the target object 400 to the apparatus by applying TOF principle on the basis of the time the laser beam was emitted from the light source 301 and the time the reflected beam entered the light-receiving element 311 based on the electric signal detected from the light-receiving element 311. Further, by linking the control apparatus 320 and the drive unit 101 of the light control apparatus 200, the direction of the laser beam L1 emitted from the light control apparatus 200 can be determined at the time the laser beam L1 is emitted and thus, it is possible to determine the location and the direction of the target object 400. By scanning the laser beam L1, it is also possible to determine the size and shape of the target object 400. Further, by scanning the laser beam L1 repeatedly, it is also possible to determine the moving direction and the moving speed of the target object 400. Hence, it is possible to achieve a function equivalent to a standard TOF (time-of-flight) camera.

Figure 13B:
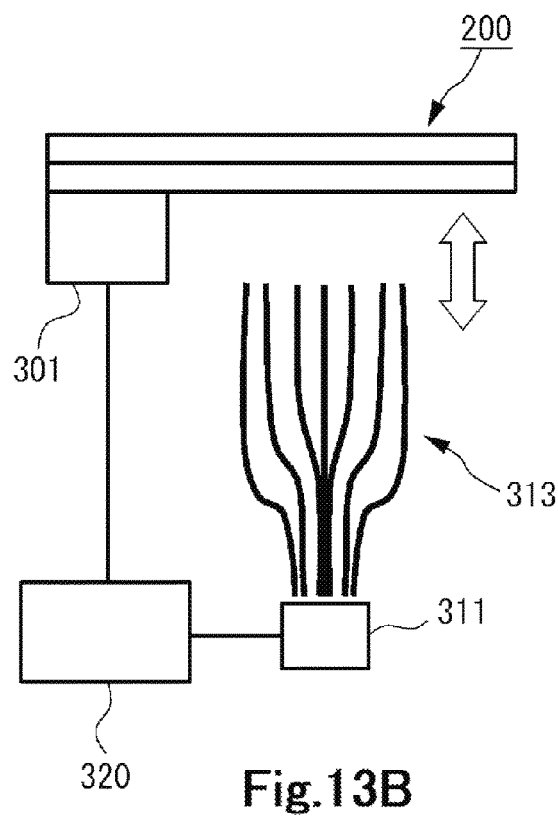
FIG. 13B is a diagram showing another configuration example of the light-entry apparatus and the light-receiving apparatus.

FIG. 13B is a diagram showing another configuration example of the light-entry apparatus and the light-receiving apparatus. In the configuration example shown in FIG. 13B, the configuration of the light-receiving apparatus 310 differs from the one in FIG. 13A while the other configuration remains the same. Specifically, the light-receiving apparatus 310 in this example is configured to include a light-receiving element 311 and an optical fiber optical system 313.

The optical fiber optical system 313 is configured to include a number of optical fibers where each fiber is in one-to-one correspondence to each of the light control regions 20 that does not correspond to the light source 301 among the light control regions 20 of the light control apparatus 200. Each of the light entering openings (end parts) of the optical fibers is disposed such that each light entering opening receives only the light emitting in the direction normal to the surface of each of the light control regions 20. In such an arrangement, any light whose emitting direction is non-normal to the surface of each of the light control regions 20 does not enter the optical fiber and consequently does not enter the light-receiving element 311.

It is not preferable to closely adhere each end part of the optical fibers of the optical fiber optical system 313 to the surface of the light control apparatus 200 since stray lights could enter the fibers. Thus, as shown in the figure, each of the light entering opening is disposed at a position where each of the openings (end parts) substantially aligns with the corresponding light control region 20 in plane view and is disposed at a fixed distance from the surface of the light control apparatus 200. Thus, it is possible to allow only reflected lights L2 from the target object 400 (refer to FIG. 14) to enter the light-receiving element 311 via each of the optical fibers while avoiding stray lights (disturbing lights) from entering the element. The above stated fixed distance is determined according to the size (area) of each of the light control regions 20 in plane view and the spread angle of the emitting light. Here, it is preferable that the size of each of the light entering openings of the optical fibers (in plane view) and the size of each of the light control regions 20 (in plane view) are substantially the same. For example, when the size of each of the light control regions 20 is 1000 μm square and the spread angle of the emitting light is 3 degrees, the distance between the surface of the light control apparatus 200 and each of the light entering openings of the optical fibers is about 19 mm.

Figure 13C:
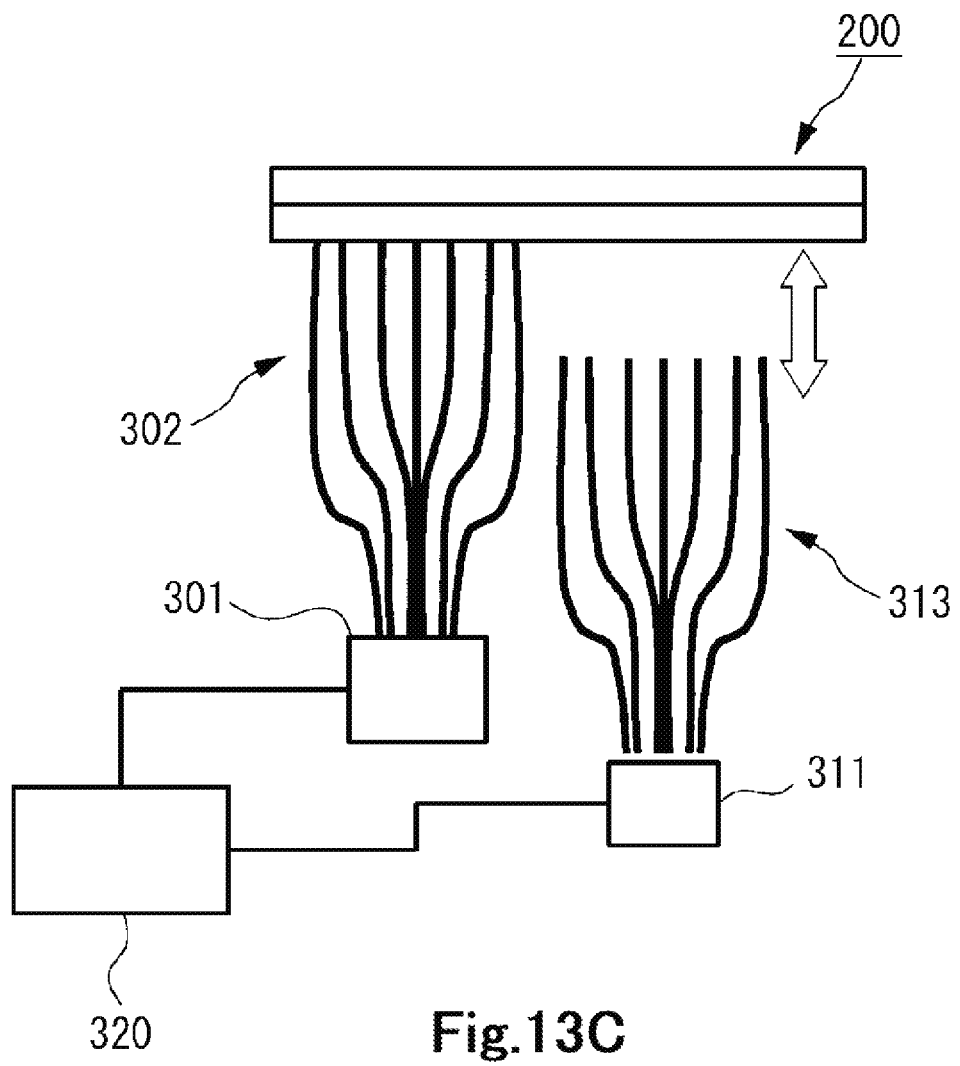
FIG. 13C is a diagram showing another configuration example of the light-entry apparatus and the light-receiving apparatus.

FIG. 13C is a diagram showing another configuration example of the light-entry apparatus and the light-receiving apparatus. In the configuration example shown in FIG. 13C, the configuration of the light-entry apparatus 300 differs from the one in FIG. 13B while the other configuration remains the same. Specifically, the light-entry apparatus 300 in this example is configured to include a light source 301 and an optical fiber optical system 302.

The optical fiber optical system 302 is configured to include a number of optical fibers where each fiber is in one-to-one correspondence to each of the light control regions 20 that corresponds to the light source 301 among the plurality of light control regions 20 of the light control apparatus 200. Each of the end parts of the optical fibers is disposed such that the light emitting from each end part enters in the direction normal to the surface of each of the light control regions 20. In the shown example, each of the end parts is disposed so as to be adhered closely to the surface of the light control apparatus 200. In such a configuration, it is possible to cope with a case where the output power of the light source 301 is so high that it is difficult to emit a laser beam into a single light control region 20.

Further, with respect to the configuration of the light-receiving apparatus 310, a lens optical system similar to the one shown in FIG. 13A may be used.

Here, while referring to FIG. 14 again, the reason why the light emitting and receiving system of the embodiment hardly picks up noise lights will be described. As described above, as the laser beam L1 emitted from the light source 301 enters the light control apparatus 200 in a direction normal to the surface of the apparatus, the advancing direction of the laser beam L1 is then bent by the light control apparatus 200 and emitted therefrom. The laser beam L1 emitted from the apparatus is diffused and reflected at the target object 400 and the regular reflection components of laser beam L1 return to the light control apparatus 200 as reflected lights L2. The reflected lights L2 enter the light control apparatus 200 to have their directions bent and are emitted to the direction normal to the surface of the light control apparatus 200. The reflected lights L2 emitted from the light control apparatus 200 are collected by the lens optical system 312 and then enter the light-receiving element 311. Meanwhile, regarding a plurality of noise lights (stray lights, disturbing lights) entering the light control apparatus 200 whose entering direction is other than the direction of the reflected lights L2 from the target object 400, these lights are bent to the direction non-normal to the surface of the light control apparatus 200 and emitted therefrom. Since the lens of the lens optical system 312 functions to collect lights entering from the normal direction only and emit them to the light-receiving element 311, noise lights will not be collected and emitted to the light-receiving element 311. Thus, the light emitting and receiving system of the embodiment hardly picks up noise light.

Based on the foregoing embodiments, since the light emitting and receiving system is configured by a transmission type optical system using a flat-plate shaped light control apparatus constituted by liquid crystal elements, it is possible to simplify the optical system, simplify the structure, reduce the size and the cost of the light emitting and receiving system. Further, by collectively forming a plurality of the light control regions (light control parts) between a pair of substrates, dispersion of characteristics among each of the light control regions is reduced and therefore it is possible to homogenize the state of the receiving light beams.

Note that this invention is not limited to the subject matter of the foregoing embodiments, and can be implemented by being variously modified within the scope of the present invention as defined by the appended claims. For example, in the light control apparatus of the foregoing embodiments, a half-wave plate (λ/2 plate) may further be combined. In this case, two of the above-described liquid crystal elements 100b each corresponding to cell 2 may be disposed to overlap each other, and a half-wave plate may be dispose therebetween, for example. Here, a half-wave plate may be disposed between two of the liquid crystal elements 100a each corresponding to cell 1 as well.

Further, in the light control apparatus of the foregoing embodiments, black masks (light shielding films) may further be disposed to cover the gaps between each of the light control regions 20, for example. In this case, each of the electrodes 3a, 3b may be configured with a transparent electrode. The black masks may be disposed to the first substrate 1 or the second substrate 2 to overlap with at least each of the electrodes 3a, 3b, for example.

Figure 15:
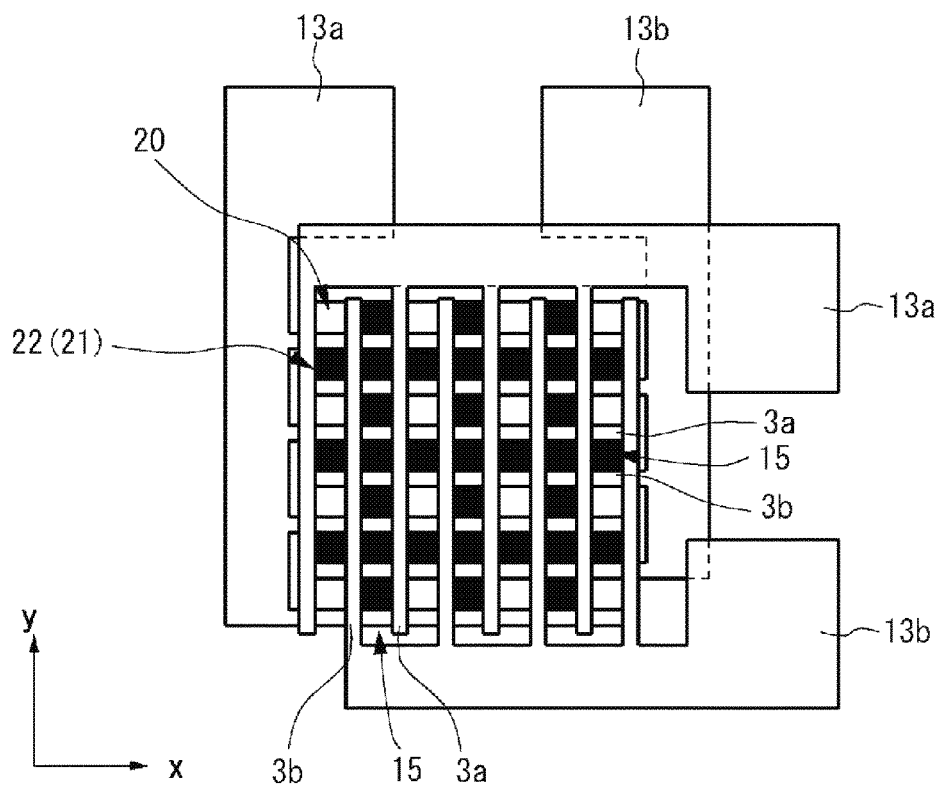
FIG. 15 is a figure describing a modified example where black masks (light shielding films) are disposed to the rectangular areas other than the light control regions.

Further, as illustrated in FIG. 15, the black masks (the light shielding films) may be disposed to the rectangular areas 21 other than the light control regions 20 of the light control apparatus. As shown, each of the black masks 22 is disposed to overlap with each of the rectangular areas 21. Each of the black masks 22 may be disposed to the region corresponding to each of the rectangular areas 21 between each of the electrodes 3a, 3b on one surface of the first substrate 1, or to the region corresponding to each of the rectangular areas 21 on one surface of the second substrate 2, for example. (Refer to FIG. 3.) With regard to the specific material and manufacturing method, etc. of each of the black masks 22, an art well-known in the technical field of a liquid crystal display apparatus, etc. may be used. By disposing each of these black masks 22, it is possible to reduce noise lights entering each of the rectangular areas 21.

Figure 16:
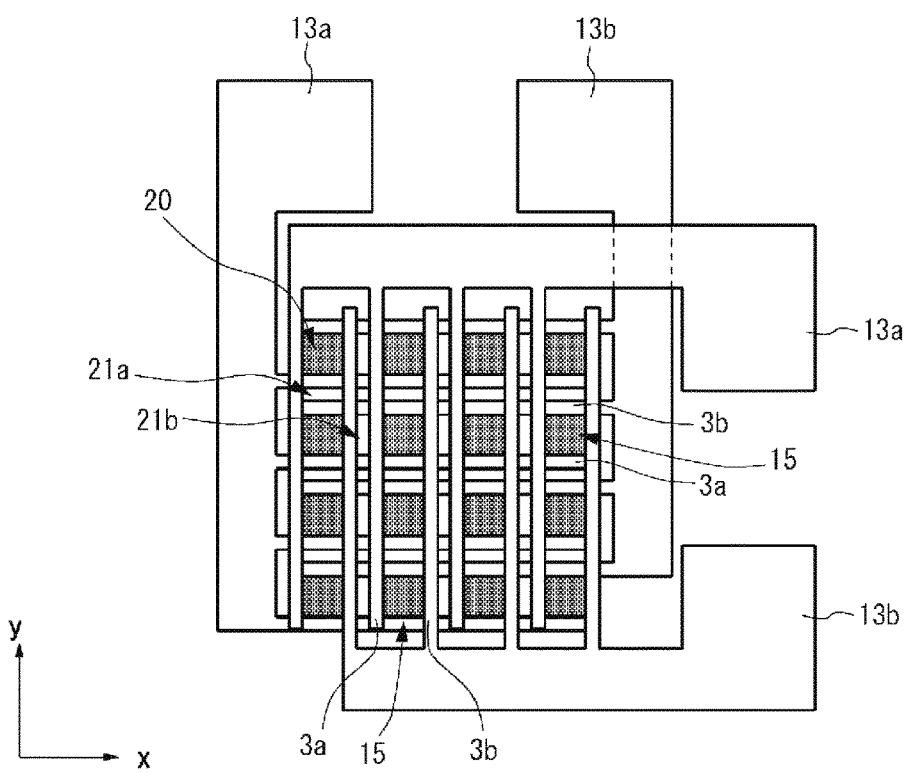
FIG. 16 is a figure describing a modified example where the size (area) of each of the light control regions is formed to become relatively larger than that of each of the rectangular areas.

Further, as illustrated in FIG. 16, the size (area) of each of the light control regions 20 may be made to become relatively larger than that of each of the rectangular areas 21. As shown, instead of arranging space between each pair of the electrodes 3a, 3b at equal intervals, by narrowing the spacing between one pair of the electrodes 3a, 3b and widening the spacing between the adjacent pair of the electrodes 3a, 3b, the size of each of the light control regions 20 can be made relatively larger. The rectangular areas 21 whose sizes are relatively small consist of laterally-long rectangular areas 21a and vertically-long rectangular areas 21b, as shown in the figure. As described, by increasing the size of each of the light control regions 20, it is possible to reduce noise lights and to ensure a large quantity of light to be made incident.

Figure 17:
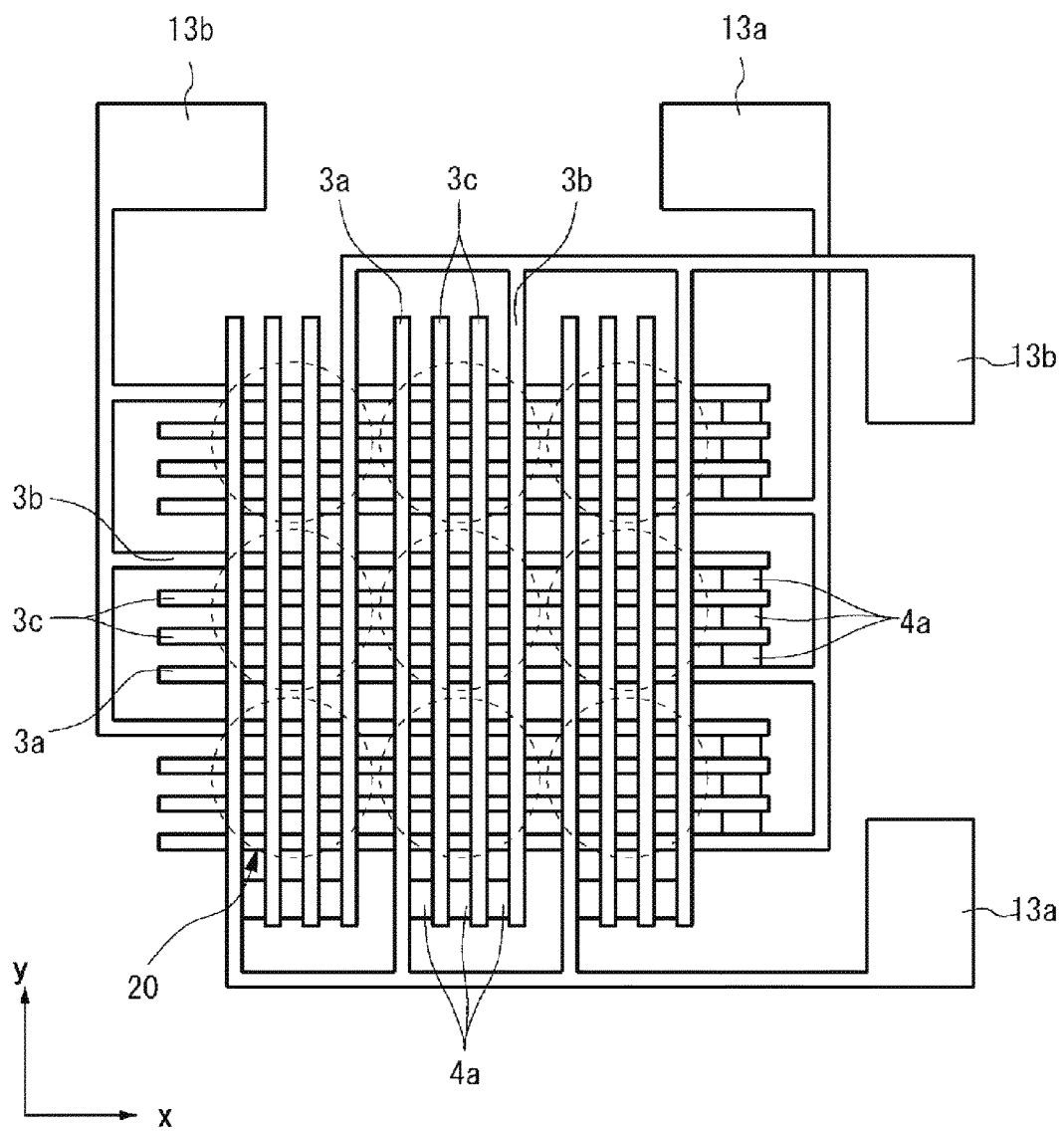
FIG. 17 is a figure describing a modified example related to the electrode structure of the light control apparatus.

Further, the light control apparatus with two liquid crystal elements may differ in its configuration. For example, as shown in FIG. 17, with respect to the liquid crystal element 100a on the front side, between each pair of the electrodes 3a, 3b extending in the vertical direction (the y-direction), two electrodes 3c are disposed similarly extending in the vertical direction. In the example shown in the figure, although there are two electrodes 3c, there may be more or there may be only one. In the horizontal direction of each of the electrodes 3a, 3b, 3c, a spacing is provided between the neighboring electrodes. The pair of the electrodes 3a, 3b and the electrodes 3c disposed therebetween are electrically and physically connected via the high-resistance film 4a at their one ends. Here, in addition to connecting each ends of the electrodes 3a, 3b, 3c, the high-resistance film 4a may be arranged to connect the electrodes at their other ends. The high-resistance film 4a referred to here is made of material similar to the high-resistance film 4 used in the foregoing embodiments. The same structure applies to the liquid crystal element 100b on the back side, and each of the electrodes 3a, 3b, 3c extends in the horizontal direction (the x-direction) and are electrically and physically connected via the high-resistance film 4a at their one ends. The light control apparatus as described above may be used in this invention. In this case, as shown in the figure, each of the light control regions 20 is configured by a pair of the electrodes 3a, 3b and the electrodes 3c disposed therebetween. In the example shown in the figure, each of the light control regions 20 includes nine (3×3) sub-regions. Since a continuous voltage gradient can be generated between the electrode 3a and the electrode 3b at each of the light control regions 20, when the controlled light enters the whole region including the sub-regions, light control function similar to the above-described embodiments may be achieved.

Further, although the light control apparatus in the above-described embodiments are configured to use two liquid crystal elements, the light control apparatus may be configured to use one liquid crystal element. In this case, a light emitting and receiving system that scans the emitting light in one direction to detect a target object can be configured.

What is claimed is:

1. A light emitting and receiving system that detects a target object with the use of reflected lights gained from a light irradiated to the target object comprising:
   a flat-plate shaped light control apparatus having a plurality of light control parts capable of bending the direction of an incident light,
   a light-entry apparatus that allows light to enter into one or more light control parts of the plurality of light control parts,
   a light-receiving apparatus that receives emitting light from the remaining one or more light control parts of the plurality of light control parts,
   a control apparatus that controls the operation of the light-entry apparatus and the light-receiving apparatus, and detects the target object using a signal according to the state of the emitting light emitted from the light-receiving apparatus,
   wherein the light control apparatus includes liquid crystal elements supporting the plurality of light control parts between a pair of substrates and a drive unit to drive the liquid crystal elements.

2. The light emitting and receiving system according to claim 1,
   wherein each of the plurality of light control parts comprises:
   a pair of electrodes disposed with a gap therebetween in a planer view,
   a high-resistance film whose sheet resistance is higher than that of the pair of electrodes disposed between the pair of electrodes,
   a liquid crystal layer disposed at least to the region overlapping the high-resistance film, between the pair of substrates.

3. The light emitting and receiving system according to claim 2 further comprising,
   a lens optical system which collects the emitting light from the light control apparatus, and
   a light-receiving element which outputs an electric signal according to the intensity of the emitting light collected from the lens optical system.

4. The light emitting and receiving system according to claim 2 further comprising,
   an optical fiber optical system which collects the emitting light from the light control apparatus, and
   a light-receiving element which outputs an electric signal according to the intensity of the emitting light collected from the optical fiber optical system.

5. The light emitting and receiving system according to claim 2,
   wherein the pair of electrodes have light-shielding property.

6. The light emitting and receiving system according to claim 1 further comprising,
   a lens optical system which collects the emitting light from the light control apparatus, and
   a light-receiving element which outputs an electric signal according to the intensity of the emitting light collected from the lens optical system.

7. The light emitting and receiving system according to claim 1 further comprising,
   an optical fiber optical system which collects the emitting light from the light control apparatus, and
   a light-receiving element which outputs an electric signal according to the intensity of the emitting light collected from the optical fiber optical system.

8. A light emitting and receiving system that detects a target object with the use of reflected lights gained from a light irradiated to the target object comprising:
   a flat-plate shaped light control apparatus having a plurality of light control parts capable of bending the direction of an incident light,
   a light-entry apparatus that allows light to enter into one or more light control parts of the plurality of light control parts,
   a light-receiving apparatus that receives emitting light from the remaining one or more light control parts of the plurality of light control parts,
   a control apparatus that controls the operation of the light-entry apparatus and the light-receiving apparatus, and detects the target object using a signal according to the state of the emitting light emitted from the light-receiving apparatus,
   wherein the light control apparatus comprises:
   a first liquid crystal element supporting a plurality of first light control parts capable of bending the incident light in a first direction between a pair of substrates,
   a second liquid crystal element disposed to overlap the first liquid crystal element supporting a plurality of second light control parts capable of bending the incident light in a second direction which crosses the first direction between a pair of substrates,
   a drive unit to drive the first liquid crystal element and the second liquid crystal element, and
   wherein each of the plurality of light control parts is configured to overlap with one of the plurality of first light control parts and one of the plurality of second light control parts.

9. The light emitting and receiving system according to claim 8,
   wherein each of the plurality of first light control parts and the plurality of second light control parts comprises:
   a pair of electrodes disposed with a gap therebetween in a planer view,
   a high-resistance film whose sheet resistance is higher than that of the pair of electrodes disposed between the pair of electrodes,
   a liquid crystal layer disposed at least to the region overlapping the high-resistance film, between the pair of substrates.

10. The light emitting and receiving system according to claim 9,
    wherein each of the plurality of first light control parts and the plurality of second light control parts further comprises:
    a common electrode provided to oppose the pair of electrodes and interpose the liquid crystal layer between the pair of electrodes and the common electrode.

11. The light emitting and receiving system according to claim 10 further comprising,
    a lens optical system which collects the emitting light from the light control apparatus, and
    a light-receiving element which outputs an electric signal according to the intensity of the emitting light collected from the lens optical system.

12. The light emitting and receiving system according to claim 10 further comprising,
    an optical fiber optical system which collects the emitting light from the light control apparatus, and a light-receiving element which outputs an electric signal according to the intensity of the emitting light collected from the optical fiber optical system.

13. The light emitting and receiving system according to claim 9 further comprising, a lens optical system which collects the emitting light from the light control apparatus, and a light-receiving element which outputs an electric signal according to the intensity of the emitting light collected from the lens optical system.

14. The light emitting and receiving system according to claim 9 further comprising, an optical fiber optical system which collects the emitting light from the light control apparatus, and a light-receiving element which outputs an electric signal according to the intensity of the emitting light collected from the optical fiber optical system.

15. The light emitting and receiving system according to claim 8 further comprising, a lens optical system which collects the emitting light from the light control apparatus, and a light-receiving element which outputs an electric signal according to the intensity of the emitting light collected from the lens optical system.

16. The light emitting and receiving system according to claim 8 further comprising, an optical fiber optical system which collects the emitting light from the light control apparatus, and a light-receiving element which outputs an electric signal according to the intensity of the emitting light collected from the optical fiber optical system.

17. The light emitting and receiving system according to claim 9, wherein the pair of electrodes have light-shielding property.

* * * * *